United States Patent
Kamekura

(10) Patent No.: US 11,610,560 B2
(45) Date of Patent: Mar. 21, 2023

(54) OUTPUT APPARATUS, OUTPUT SYSTEM, AND METHOD OF CHANGING FORMAT INFORMATION

(71) Applicant: Takahiro Kamekura, Tokyo (JP)

(72) Inventor: Takahiro Kamekura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/221,844

(22) Filed: Apr. 5, 2021

(65) Prior Publication Data

US 2021/0312881 A1 Oct. 7, 2021

(30) Foreign Application Priority Data

Apr. 7, 2020 (JP) .............................. JP2020-069317

(51) Int. Cl.
G09G 5/00 (2006.01)
G06F 3/041 (2006.01)
G09G 5/391 (2006.01)

(52) U.S. Cl.
CPC ......... *G09G 5/005* (2013.01); *G06F 3/04162* (2019.05); *G09G 5/391* (2013.01); *G09G 2330/026* (2013.01); *G09G 2370/042* (2013.01)

(58) Field of Classification Search
CPC .. G09G 5/005; G09G 5/391; G09G 2330/026; G06F 3/04162
USPC ........................................................ 345/156
See application file for complete search history.

(56) References Cited

U.S. PATENT DOCUMENTS

| | | | | |
|---|---|---|---|---|
| 2001/0037509 | A1* | 11/2001 | Kligman | H04N 7/181 348/E7.086 |
| 2005/0015480 | A1* | 1/2005 | Foran | G08B 13/19634 709/224 |
| 2007/0222779 | A1 | 9/2007 | Fastert et al. | |
| 2008/0080596 | A1* | 4/2008 | Inoue | H04N 21/4363 375/211 |
| 2008/0133249 | A1* | 6/2008 | Hashiguchi | G10L 19/167 704/500 |
| 2012/0127434 | A1* | 5/2012 | Sasazaki | G02B 30/24 353/7 |
| 2014/0043538 | A1* | 2/2014 | Wang | H04N 5/775 348/720 |

(Continued)

FOREIGN PATENT DOCUMENTS

| | | |
|---|---|---|
| JP | 2008-158220 | 7/2008 |
| JP | 2013-255215 A | 12/2013 |

(Continued)

OTHER PUBLICATIONS

Extended European Search Report dated Sep. 6, 2021 in European Patent Application No. 21167154.0, 44 pages.

*Primary Examiner* — Jonathan M Blancha

(74) *Attorney, Agent, or Firm* — Xsensus LLP

(57) ABSTRACT

An output apparatus includes circuitry to receive content data from a transmission source of the content data. The circuitry checks first format information for the content data to be output. The circuitry changes second format information of the content data to the first format information. The second format information is supported by a capture board. The capture board is connected between the transmission source and the output apparatus. The circuitry outputs the content data.

12 Claims, 28 Drawing Sheets

(56) References Cited

U.S. PATENT DOCUMENTS

| | | |
|---|---|---|
| 2014/0211941 A1* | 7/2014 | Oh .................. H04N 21/2347 380/201 |
| 2015/0261699 A1 | 9/2015 | Fujikawa et al. |
| 2015/0341435 A1 | 11/2015 | Hamada et al. |
| 2016/0050375 A1 | 2/2016 | Soffer et al. |
| 2017/0178290 A1 | 6/2017 | Sugiura et al. |
| 2019/0005917 A1 | 1/2019 | Urata et al. |

FOREIGN PATENT DOCUMENTS

| | | |
|---|---|---|
| JP | 2015-225400 | 12/2015 |
| JP | 2016-009905 | 1/2016 |
| JP | 2017-142355 | 8/2017 |
| JP | 2021-036401 | 3/2021 |
| WO | WO2015/098841 A1 | 7/2015 |

* cited by examiner

FIG. 7

| PAGE DATA ID | START TIME | END TIME | STROKE ARRANGEMENT DATA ID | MEDIUM DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG. 8

| STROKE DATA ID | START TIME | END TIME | COLOR | WIDTH | st001 COORDINATE ARRANGE- MENT DATA ID | st002 COORDINATE ARRANGE- MENT DATA ID | st003 COORDINATE ARRANGE- MENT DATA ID |
|---|---|---|---|---|---|---|---|
| s001 | 20130610102502 | 20130610102505 | ff0000 | 2 | c001 | ... | ... |
| s002 | 20130610102612 | 20130610102615 | 000ff0 | 3 | c002 | ... | ... |
| s003 | 20130610102704 | 20130610102712 | 0 | 1 | c003 | ... | ... |
| ... | ... | ... | ... | ... | ... | ... | ... |

FIG. 9

| | c001 | | | c002 | | c003 | |
|---|---|---|---|---|---|---|---|
| X COORDINATE | Y COORDINATE | DIFFERENCE TIME | PRESSURE | | PRESSURE | | PRESSURE |
| 10 | 10 | 100 | 255 | | ... | | ... |
| 12 | 10 | 200 | 255 | | ... | | ... |
| 14 | 12 | 300 | 255 | | ... | | ... |
| ... | ... | ... | ... | | ... | | ... |

FIG. 10

| MEDIUM DATA ID | DATA TYPE | RECORDING TIME | X COORDINATE | Y COORDINATE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

FIG. 11

| PRODUCT ID | LICENSE ID | EXPIRATION DATE |
|---|---|---|
| 1001 | 12345678abcdefgh | 2012/12/31 |
| 1001 | 4321dcba8765hgfe | |
| ⋮ | ⋮ | ⋮ |

FIG. 12

| NAME | MAIL ADDRESS |
|---|---|
| TARO | taro@alpha.co.jp |
| HANAKO | hanako@beta.co.jp |
| — | jiro@gamma.co.jp |
| ⋮ | ⋮ |

FIG. 13

| |
|---|
| iwb-20130610104423.pdf |
| iwb-20130625152245.pdf |
| iwb-20130628113418.pdf |
| ⋮ |

FIG. 14

| NAME | IP ADDRESS |
|---|---|
| CONFERENCE ROOM 1 | 192.0.0.1 |
| CONFERENCE ROOM 2 | 192.0.0.2 |
| — | 192.0.0.3 |
| ⋮ | ⋮ |

FIG. 15

| NAME | IP ADDRESS |
|---|---|
| CONFERENCE ROOM 1 | 192.0.0.1 |
| CONFERENCE ROOM 2 | 192.0.0.2 |
| — | 192.0.0.8 |
| ⋮ | ⋮ |

FIG. 16

SESSION ID : se01

| ID | SEQUENCE NUMBER | body | parent |
|---|---|---|---|
| se01 | 1 | children:pag01,pag02,pag03,pag04<br>current page:pag04 | . . . |
| pag01 | 2 | Image Data URL://XXX.jpeg | se01 |
| sr001 | 3 | Color (RGBA):(0,0,0,0)<br>Width (px):10px<br>Vertexes (x,y):(0,0),(10,0),(20,1),(30,10) | pag01 |
| sr002 | 4 | Color (RGBA):(128,0,0,0)<br>Width (px):14px<br>Vertexes (x,y):(10,50),(15,55),(16,40) | pag01 |
| . . . | . . . | . . . | . . . |
| pag02 | 12 | — | se01 |
| sr010 | 13 | Color (RGBA):(255,255,255,0)<br>Width (px):10px<br>Vertexes (x,y):(100,20),(110,30),(11,40) | pag02 |
| . . . | . . . | . . . | . . . |
| pag04 | 50 | Image Data URL://YYY.jpeg | se01 |
| sr048 | 51 | Color (RGBA):(255,255,128,0)<br>Width (px):13px<br>Vertexes (x,y):(57,60),(123,43) | pag04 |
| . . . | . . . | . . . | . . . |

FIG. 17
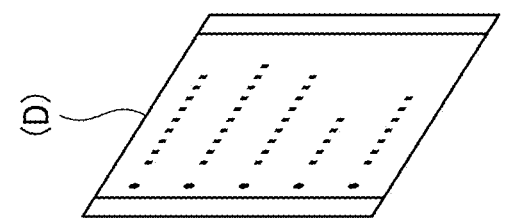
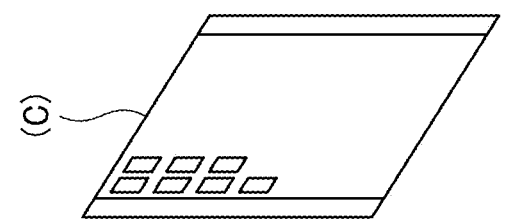
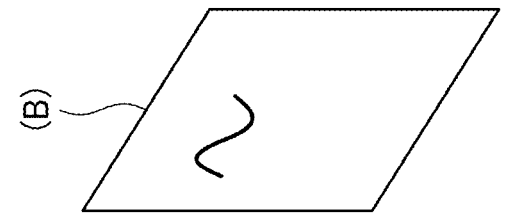
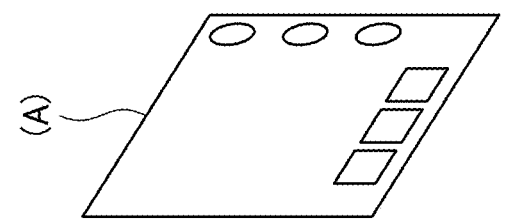
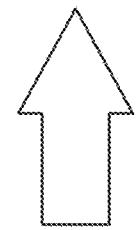
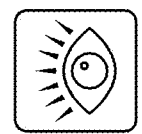

FIG. 23

| HORIZONTAL RESOLUTION | VERTICAL RESOLUTION | REFRESH RATE (Hz) |
|---|---|---|
| 720 | 400 | 70 |
| 640 | 480 | 60 |
| 800 | 600 | 60 |
| 1024 | 768 | 60 |
| 1280 | 960 | 60 |
| 1280 | 1024 | 60 |
| 1680 | 1050 | 60 |
| 1600 | 1200 | 60 |
| 1920 | 1080 | 60 |

FIG. 31

| Channels | Sampling Frequencies (KHz) | Bitrate (bit depth) |
|---|---|---|
| 2 | 32 | 16 |
| 2 | 44.1 | 16 |
| 2 | 48 | 16 |
| 2 | 88 | 16 |

OUTPUT APPARATUS, OUTPUT SYSTEM, AND METHOD OF CHANGING FORMAT INFORMATION

CROSS-REFERENCE TO RELATED APPLICATION

This patent application is based on and claims priority pursuant to 35 U.S.C. § 119(a) to Japanese Patent Application No. 2020-069317, filed on Apr. 7, 2020, in the Japan Patent Office, the entire disclosure of which is hereby incorporated by reference.

BACKGROUND

Technical Field

Embodiments of the present disclosure relate to an output apparatus, an output system, and a method of changing format information.

Related Art

Output apparatuses such as display devices that display handwritten data made with a pen or a finger on a touch panel are known. An output apparatus equipped with a relatively large touch panel display is arranged in a conference room or the like, and is shared by a plurality of users as an electronic whiteboard or the like. Further, such an output apparatus may have a function of outputting content data such as a video image and audio transmitted by a personal computer (PC) or the like. Further, such an output apparatus may communicate with output apparatuses of other sites through a network to transmit or receive the content data, and to share the handwritten data and screens displayed by output device such as a display.

A controller of the output apparatus acquires Extended Display Identification DATA (EDID) from the display and transmits a video image at a resolution and refresh rate supported by the display. A method of displaying a video image using EDID is known. There is a known displaying method in which a video image transmission device uses different EDID to retry to connects to a video image display device, in a case where the connection between the video image display device and the video image transmission device is unstable and automatic detection is failed to be performed.

SUMMARY

An exemplary embodiment of the present disclosure includes an output apparatus including circuitry to receive content data from a transmission source of the content data. The circuitry checks first format information for the content data to be output. The circuitry changes second format information of the content data to the first format information. The second format information is supported by a capture board. The capture board is connected between the transmission source and the output apparatus. The circuitry outputs the content data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a conceptual diagram illustrating a data structure of page data, according to one or more embodiments;

FIG. 8 is a conceptual diagram illustrating a data structure of stroke arrangement data, according to one or more embodiments;

FIG. 9 is a conceptual diagram illustrating a data structure of coordinate arrangement data, according to one or more embodiments;

FIG. 10 is a conceptual diagram illustrating a data structure of medium data, according to one or more embodiments;

FIG. 11 is a conceptual diagram illustrating a remote license management table, according to one or more embodiments;

FIG. 12 is a conceptual diagram illustrating an address book management table, according to one or more embodiments;

FIG. 13 is a conceptual diagram illustrating a data structure of backup data, according to one or more embodiments;

FIG. 14 is a conceptual diagram illustrating a connection destination management table, according to one or more embodiments;

FIG. 15 is a conceptual diagram illustrating a site management table, according to one or more embodiments;

FIG. 16 is a conceptual diagram illustrating a data structure of operation data, according to one or more embodiments;

FIG. 17 is an illustration of a configuration of image layers, according to one or more embodiments;

FIG. 23 is a diagram illustrating an example of a video image format stored by a displayable video image storage unit and an acceptable video image format storage unit, according to one or more embodiments;

FIG. 31 is a diagram illustrating an example of EDID related to the audio information, according to one or more embodiments.

Figure 1:
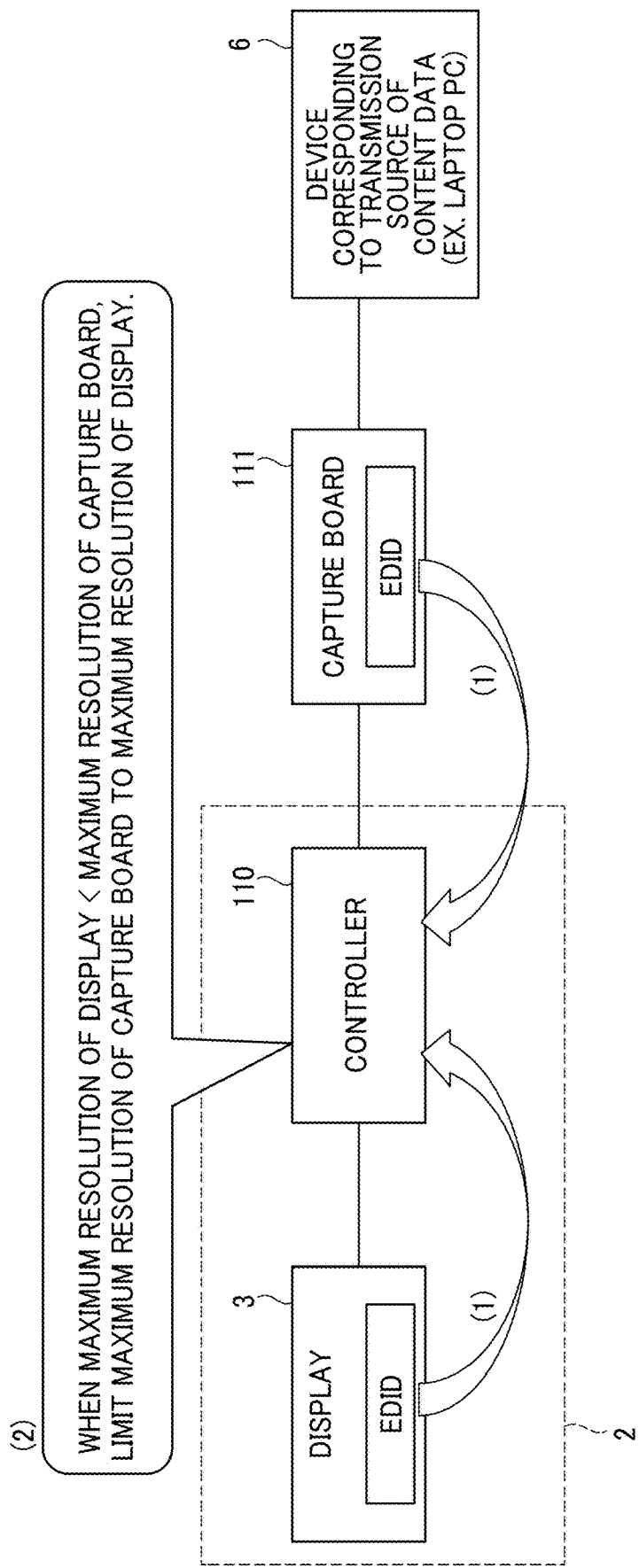
FIG. 1 is a diagram illustrating an example of an operation of changing extended display identification data (EDID) of a capture board, performed by a controller included in a display device, according to one or more embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of a display device and a method of changing format information performed by the display device according to one or more embodiments of the present disclosure, with reference to the attached drawings.

Overview of Operation of Display Device

A description is given below of an overview of an operation performed by a display device 2 according to one of the embodiments of the disclosure with reference to FIG. 1. FIG. 1 is a diagram illustrating an example of an operation of changing extended display identification data (EDID) of a capture board 111, performed by a controller 110 included in the display device 2, according to the present embodiment.

The display device 2 includes the controller 110 and a display 3. When the display device 2 is used, the capture board 111 is attached to the display device 2. In addition, when the display device 2 is used, the display 3 and the capture board 111 are connected to the controller 110. The controller 110, the display 3, and the capture board 111 may be distributed individually. Alternatively, the controller 110 and the display 3 may be connected to each other and distributed as the display device 2, and the capture board 111 may be distributed as a single unit (for external use), which is optional.

1)

The controller 110 is capable of acquiring EDID (an example of first format information) from the display 3. The controller 110 is also capable of acquiring EDID (an example of second format information) from the capture board 111.

2)

The controller 110 determines whether the maximum resolution of the display 3 is less than the maximum resolution of the capture board 111 or not. When determining that the maximum resolution of the display 3 is less than the maximum resolution of the capture board 111, the controller 110 limits the maximum resolution of the capture board 111 to the maximum resolution of the display 3 by changing the EDID of the capture board 111. For example, in a case where the EDID of the capture board 111 supports 4K (3840×2160), but the EDID of the display 3 only supports 2K (1920×1080), the controller 110 sets to limit the maximum resolution of the EDID of the capture board 111 to 2K. Thereby, the format information (EDID) for the content data of the display 3 becomes available for transmission to a laptop personal computer (PC) 6 that is a transmission source of the content data.

When the laptop PC 6, which is a transmission source of the content data, is connected to the capture board 111 in order to output a video image (moving image), the display device 2 is able to transmit the EDID of the display 3 to the laptop PC 6, because the laptop PC 6 acquires the EDID having the maximum resolution of 2K. As a result, the laptop PC 6 transmits a video image having a resolution of 2K to the capture board 111. Because the video image having the same resolution as the maximum resolution of the display 3 is transmitted to the controller 110 from the capture board 111, the controller 110 does not need to resize the video image. Accordingly, the image quality is unlikely to deteriorate, and the load on the controller 110 is also unlikely to increase.

Regarding Terms

The "content data" is data that is transmitted by a transmission source device connected to the capture board and that is output by the controller 110. Examples of the content data includes image data and audio data.

The "output device" is device or the like that outputs the content data. In the present embodiment, a display or a projector is used as an example of the output device. The "output apparatus" is a device that outputs the content data to the output device. In the description of the present embodiment, the display device 2 is used as the output apparatus.

To output data to the output device means to display or to reproduce data. To output data to the output device may include to cause the display or the electronic pen to be vibrated.

The format information is a format of the content data. In a case of video image, the format information includes a resolution and a refresh rate. In a case of sound, the format information includes a sampling frequency and a bit rate. In the present embodiment, as an example of the format information, information included in the EDID is used.

Example of System Configuration

Figure 2:
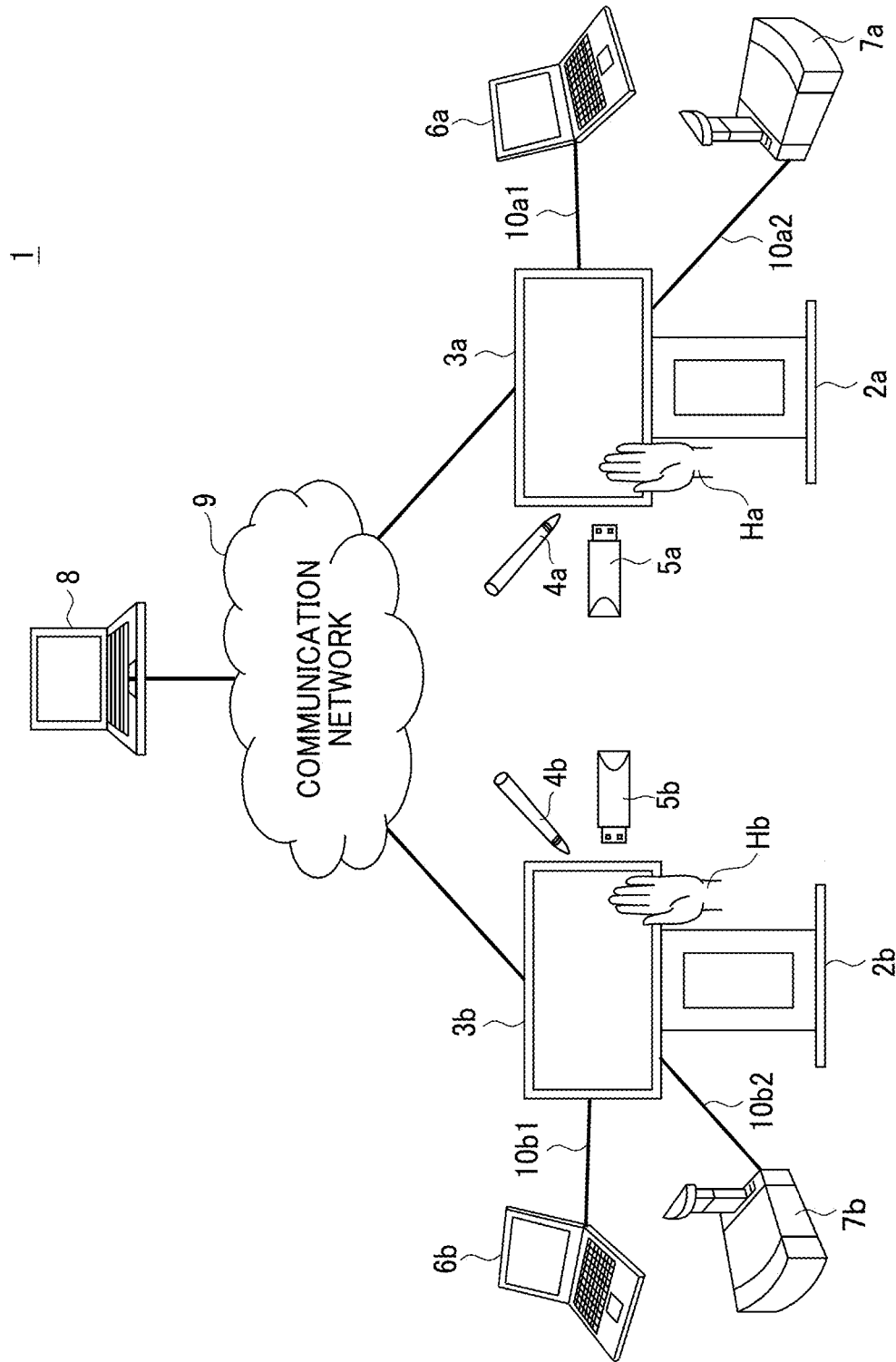
FIG. 2 is a schematic diagram illustrating an overview of a communication system according to one or more embodiments.

FIG. 2 is a schematic diagram illustrating an overview of a communication system 1 according to the present embodiment of the disclosure. In FIG. 2, two display devices 2a and 2b and two electronic pens 4a and 4b etc., are illustrated for purposes of simplification. However, three or more display devices and electronic pens etc., may be used.

As illustrated in FIG. 2, the communication system 1 includes a plurality of display devices 2a and 2b, a plurality of electronic pens 4a and 4b, Universal Serial Bus (USB) memories 5a and 5b, laptop personal computers (PCs) 6a and 6b, videoconference terminal (teleconference terminal) 7a and 7b, and a PC 8. The display devices 2a and 2b and the PC 8 are communicably connected to each other via a communication network 9. Further, the display device 2a and the display device 2b are provided with a display 3a and a display 3b, respectively.

Additionally, the display device 2a is capable of displaying, on the display 3a, an image drawn by an event generated by the electronic pen 4a (e.g., the pen tip of the electronic pen 4a or the pen bottom of the electronic pen 4a touches the display 3a). Further, in addition to the use of the electronic pen 4a, the display device 2a may change an image being displayed on the display 3a, according to an event generated by a hand Ha of a user (e.g., a gesture indicating size enlargement, size reduction, or turning pages).

The USB memory 5a is connectable to the display device 2a. The display device 2a may read electronic files such as data in a portable document format (PDF) from the USB memory 5a. The display device 2a may write the electronic files onto the USB memory 5a. The display device 2a is connected to the laptop PC 6a via a cable 10a1 capable of communicating in compliance with a standard such as Display Port (registered trademark), Digital Visual Interface (DVI), High-Definition Multimedia Interface (HDMI) (registered trademark), or Video Graphics Array (VGA). On the display device 2a, an event is caused by a user operation of making contact with the display 3a, and event information indicating the event is transmitted to the laptop PC 6a in a similar manner to an event caused by a user operation of inputting with an input device, such as a mouse and a keyboard. In a substantially the same manner, the videoconference terminal (teleconference terminal) 7a is connected to the display device 2a via the cable 10a2 capable of communicating using the above-described standard. Alternatively, the laptop PC 6a and the videoconference terminal 7a may communicate with the display device 2a through wireless communications based on various kinds of radio communication protocols such as Bluetooth (registered trademark).

At another site where the display device 2b is provided, in a similar manner to the above, the display device 2b including a display 3b, an electronic pen 4b, a USB memory 5b, a laptop PC 6b, a videoconference terminal 7b, a cable 10b1, and a cable 10b2 are used. In addition, an image displayed on the display 3b is modifiable according to an event caused by a user operation using a hand Hb of a user, for example.

Accordingly, an image that is drawn on the display 3a of the display device 2a at one site is also displayed on the display 3b of the display device 2b at the other site. By contrast, an image drawn on the display 3b of the display device 2b at the other site is also displayed on the display 3a of the display device 2a at the one site. As described above, the communication system 1 operates for sharing the same image between remotely located sites (namely, performs a remote sharing process). Due to this, using the communication system 1 in a videoconference conducted between remotely located sites is very convenient. However, regarding the description of the present embodiment, the display device 2a is not required to communicate with the display device 2b in another site.

In the following description of the present embodiment, any display device 2 among the plurality of display devices 2 may be referred to as the "display device 2". Any display 3 of the multiple displays 3 may be referred to as the "display 3". Any one (electronic pen) of the multiple electronic pens 4 may be referred to as the "electronic pen 4". Any one (USB memory) of the multiple USB memories 5 may be referred to as the "USB memory 5". Any laptop PC 6 of the multiple laptop PCs 6 may be referred to as the "laptop PC 6". Any one (videoconference terminal) of the multiple videoconference terminals 7 may be referred to as the "videoconference terminal" 7. Any one of the multiple hands of users may be referred to as the "hand H". Any one of the multiple cables may be referred to as the "cable 10".

In the description of the present embodiment, the display device 2 is used as an example of display device, however this is not limiting. Other examples of the display device include a digital signage, a telestrator that is used, for example, in sports and weather broadcasts, and a remote image (video) diagnostic device. Moreover, although the laptop PC 6 is used as an example of information processing terminal in the description of the present embodiment, no limitation is indicated thereby. Other examples of the information processing terminals include a desktop PC, a tablet PC, a smartphone, a personal data assistance (PDA), a digital video camera, a digital camera, and a video-game console, which are terminals that is capable of providing image frames. Further, the communication network includes, for example, the Internet, a local area network (LAN), and a mobile communication network. In the description of the present embodiment, a USB memory is used as an example of recording medium, however this is not limiting. As another example of recording medium, another type of recording medium such as a secure digital (SD) card may be used.

Hardware Configuration of Display Device

Figure 3:
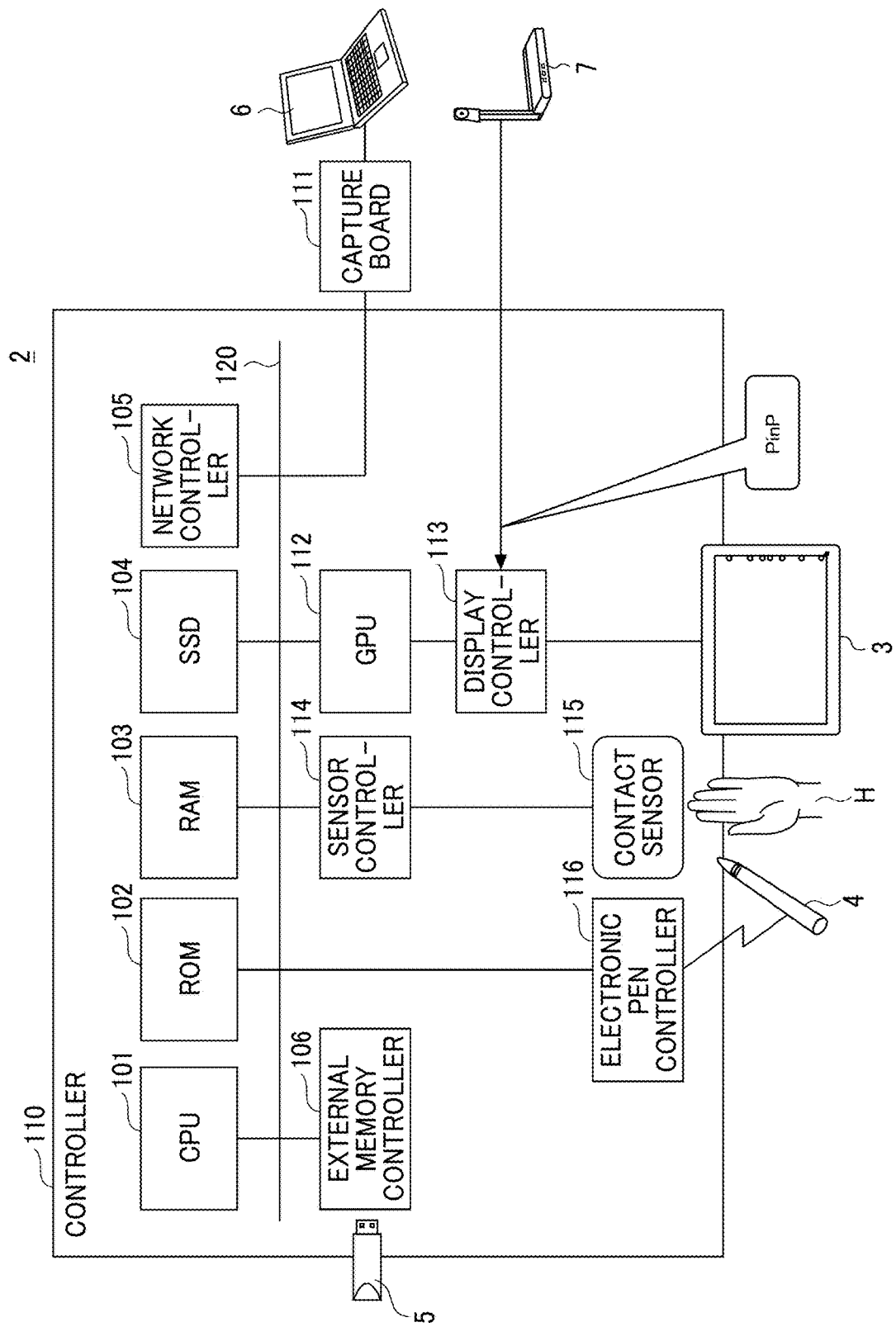
FIG. 3 is a diagram illustrating an example of a hardware configuration of an electronic whiteboard according one or more embodiments.

Subsequently, a hardware configuration of the display device 2 according to the present embodiment is described with reference to FIG. 3. FIG. 3 is a diagram illustrating an example of the hardware configuration of the display device 2 according to the present embodiment. In FIG. 3, an electronic whiteboard is used as an example of the display device 2.

The display device 2 includes the controller 110 and a display 3. When the display device 2 is used, the capture board 111 is attached to the controller 110. A state where the capture board 111 is attached to the display device 2 is referred to as an output system. Namely, the output system includes the controller 110, the display 3, and the capture board 111.

The controller 110 includes a central processing unit (CPU) 101 that controls entire operation of the controller 110, a read only memory (ROM) 102 that stores a program for operating the CPU 101 such as an initial program loader (IPL), a random access memory (RAM) 103 that is used as a work area for the CPU 101, a solid state drive (SSD) 104 that stores various types of data including a program for the display device 2, a network controller 105 that controls communication established through the communication network 9, and an external memory controller 106 that controls communication with the USB memory 5.

The controller 110 includes a graphics processing unit (GPU) 112 dedicated to processing graphical images and a display controller 113 that controls and manages screen display in order to output an image processed by (output from) the GPU to the display 3 or the videoconference terminal 7.

The controller 110 further includes a sensor controller 114 and a contact sensor 115. The sensor controller 114 controls the contact sensor 115. The contact sensor 115 detects a touch onto the display 3 with the electronic pen 4 or the hand H of a user. The contact sensor 115 inputs coordinates or detects coordinates using an infrared blocking method. The infrared interception method is a method in which two light receiving elements disposed on both upper side ends of the display 3 emit a plurality of infrared rays in parallel to a surface of the display 3, and a reflector frame surrounding the display 3 reflects the plurality of infrared rays. The light receiving elements receive lights that passes through the same optical path of the emitted infrared rays and are reflected by the reflector frame. The contact sensor 115 outputs, to the sensor controller 114, an identification (ID) of infrared rays that emitted from the two light receiving elements and that are blocked by an object (such as the user's hand). Based on the ID of the infrared rays, the sensor controller 114 detects a specific coordinate that is touched. Each of all IDs described below is an example of identification information.

The contact sensor 115 is not limited to the one using the infrared blocking method, and may be a different type of detector, such as a capacitance touch panel that identifies a contact position by detecting a change in capacitance, a resistance film touch panel that identifies a contact position by detecting a change in voltage of two opposed resistance films, or an electromagnetic induction touch panel that identifies a contact position by detecting electromagnetic induction caused by contact of an object to a display.

The controller 110 further includes an electronic pen controller 116. The electronic pen controller 116 communicates with the electronic pen 4 to detect a touch by the tip or bottom of the electronic pen 4 to the display 3. In addition or in alternative to detecting a touch by the tip or bottom of the electronic pen 4, the electronic pen controller 116 may also detect a touch by another part of the electronic pen 4, such as a part held by a hand of a user.

The controller 110 further includes a bus line 120 such as an address bus and a data bus to electrically connects the CPU 101, the ROM 102, the RAM 103, the SSD 104, the network controller 105, the external memory controller 106, the capture board 111, the GPU 112, the sensor controller 114, and the electronic pen controller 116 to each other, as illustrated in FIG. 3.

The program for the controller 110 may be stored on a computer-readable recording medium such as a compact disk read only memory (CD-ROM) for distribution. The program may be downloaded from a program distribution server (a form of the server may be cloud or on-premises).

The capture board 111 is connectable to the controller 110 via a serial cable such as USB 3.0 (an example of a receiver or a reception device). Alternatively, the capture board 111 is connectable to the controller 110 via a display cable such as HDMI (registered trademark), Display Port (registered trademark), or VGA. Alternatively, the capture board 111 may wirelessly communicate with the controller 110. The capture board 111 receives the content data (image (video image) or audio) output from the laptop PC 6 as a still image (and audio) or moving image (and audio). The video image includes an image including a still image and a moving image. The capture board 111 transmits the received still image or moving image to the controller 110. The still image or moving image may be transmitted in response to a request from the controller 110, or may be transmitted without such a request.

The capture board 111 stores EDID in an Electrically Erasable Programmable Read Only Memory (EEPROM), a Programmable ROM (PROM), or the like, and the EDID is obtainable not only from the controller 110 but also from the laptop PC 6.

The laptop PC 6 and the capture board 111 are connectable to each other via a display cable such as HDMI (registered trademark), Display Port (registered trademark), or VGA. Further, the capture board 111 and the laptop PC 6 may wirelessly transmit a video signal (image signal) to each other.

The display 3 is connectable to the controller 110 via a cable such as an Open Pluggable Specification (OPS) I/F. Alternatively, the display 3 is connectable to the controller 110 via a display cable such as HDMI (registered trademark), Display Port (registered trademark), or VGA. Alternatively, the display 3 may wirelessly communicate with the controller 110. The display 3 displays a still image or moving image output from the laptop PC 6. The display 3 also is capable of displaying handwritten data. The display 3 also is capable of displaying an image representing other site or own site.

The display 3 may be a projector, a Head Up Display (HUD), or the like, in addition to a flat panel display such as a so-called liquid crystal or organic electro luminescence (EL).

The display 3 stores EDID in an EEPROM, a PROM, or the like, and the EDID is obtainable from the controller 110.

Functional Configuration of Display Device

Figure 4:
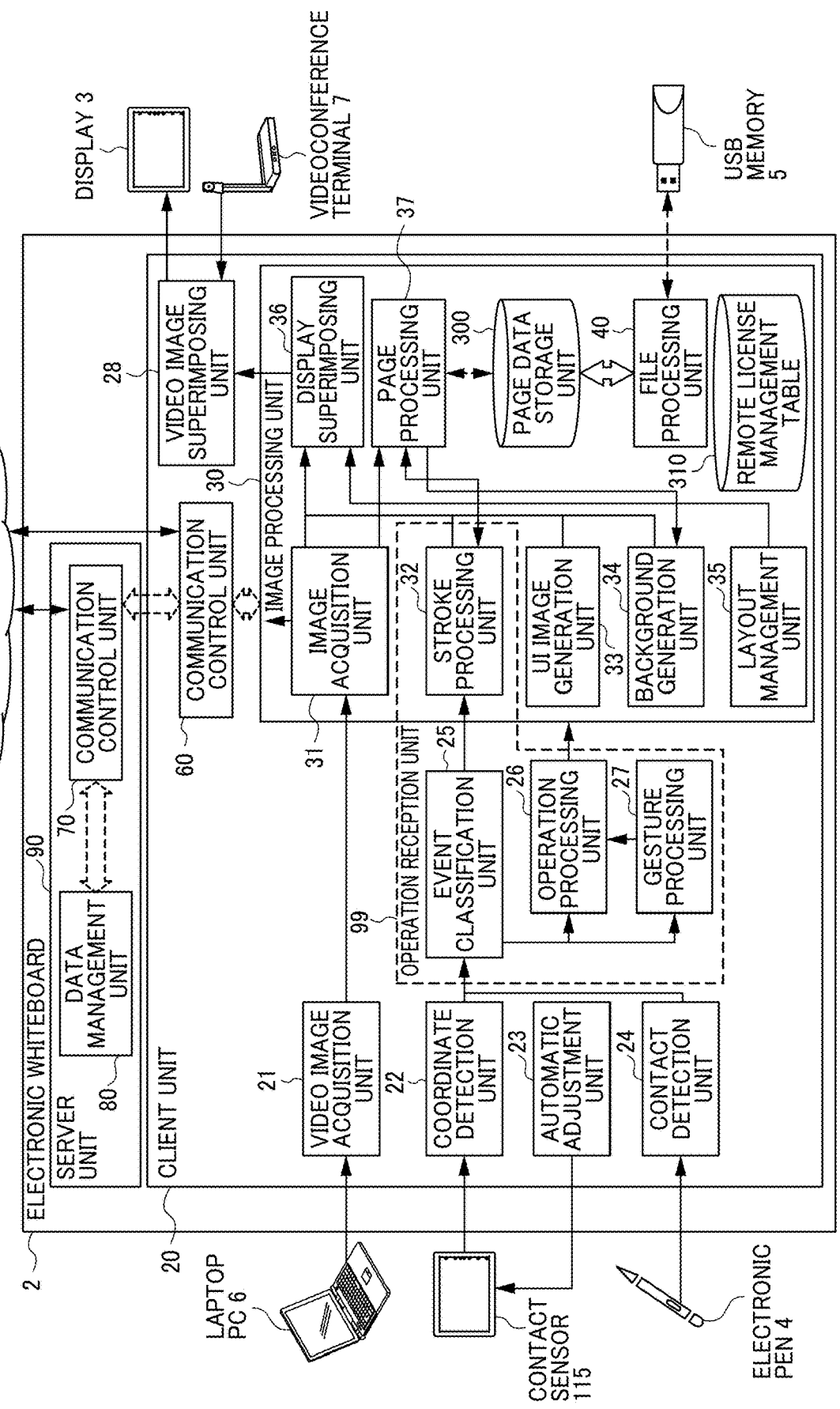
FIG. 4 is a block diagram illustrating an example of a functional configuration of an electronic whiteboard according to one or more embodiments.

Subsequently, a functional configuration of the display device 2 is described with reference to FIGS. 4 to 17. First, a description is given of an overall functional configuration of the display device 2 with reference to FIG. 4. FIG. 4 is a block diagram illustrating an example of a functional configuration of the display device 2 according to the present embodiment. In FIG. 4, an electronic whiteboard is used as an example of the display device 2.

The display device 2 the functional configuration of FIG. 4. The functional configuration is implemented by the hardware configuration of FIG. 3 that operates in cooperation with the control program. The display device 2 may function as a "host terminal" that requests to start communication to remotely share data (remote sharing process), or a "participant terminal" that participates in communication started by another terminal. The display device 2 mainly includes a client unit ("client") 20 and a server unit ("server") 90. The client unit 20 and the server unit 90 are implemented inside a single display device 2. In case where the display device 2 serves as a host terminal, such display device 2 implements both of the client unit 20 and the server unit 90. In case where the display device 2 serves as a participant terminal, the display device 2 implements the client unit 20, but not the server unit 90. That is, in FIG. 2, when the display device 2a is the host terminal and the display device 2b is the participant terminal, the client unit 20 in the display device 2a communicates with the client unit 20 in the display device 2b via the server unit 90 implemented in the display device 2a. The client unit 20 of the display device 2b communicates with the client 20 of the display device 2a via the server unit 90 implemented in the display device 2a.

Functional Configuration of Client Unit

Figure 5:
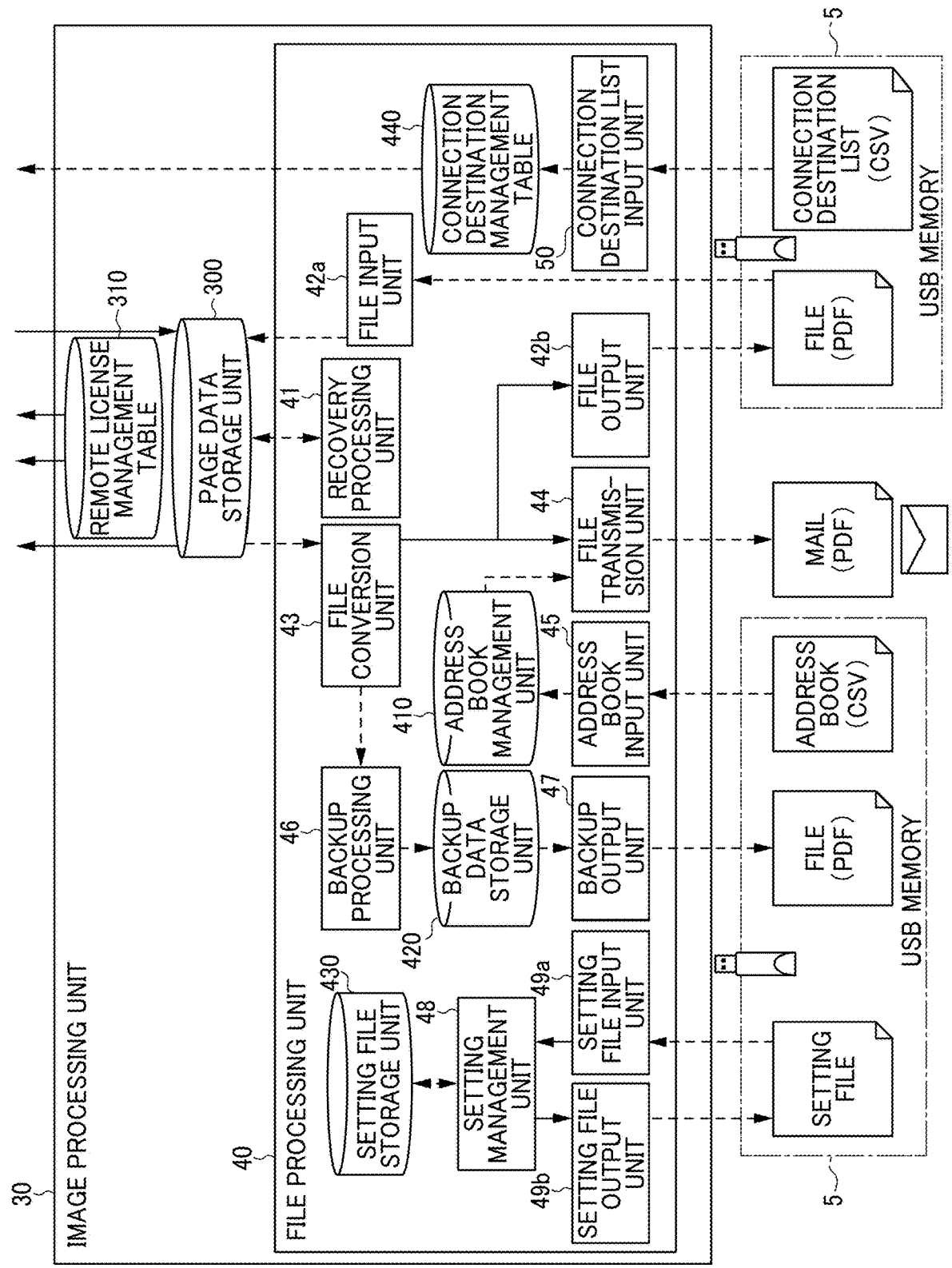
FIG. 5 is a block diagram illustrating a functional configuration of a file processing unit according to one or more embodiments.

Subsequently, a functional configuration of the client unit 20 is described mainly with reference to FIG. 4 to FIG. 6. The client unit 20 includes a video image acquisition unit 21, a coordinate detection unit 22, an automatic adjustment unit 23, a contact detection unit 24, an event classification unit 25, an operation processing unit 26, a gesture processing unit 27, a video image superimposing unit 28, an image processing unit 30, and a communication control unit 60.

The video image acquisition unit 21 acquires (from the capture board 111 illustrated in FIG. 3) a video image output from the laptop PC 6 connected to the cable 10. When receiving an image signal from the laptop PC 6, the video image acquisition unit 21 analyzes the image signal to obtain a resolution of an image frame, which is a display image of the laptop PC 6 and generated based on the image signal, and to obtain image information including update frequency of the image frame. Then the video image acquisition unit 21 outputs obtained information to an image acquisition unit 31.

The coordinate detection unit 22 detects a coordinate at which an event is detected due to a user operation on the display 3. For example, the user operation causing the event may be a touch on the display 3 with the user's hand H. The coordinate detection unit 22 also detects an area touched by user operation.

The automatic adjustment unit 23 is activated at a time of activation of the display device 2. The automatic adjustment unit 23 adjusts image processing parameters of an optical sensor camera of the contact sensor 115, such that the contact sensor 115 is successfully output an appropriate value to the automatic coordinate detection unit 22.

The contact detection unit 24 detects an event due to a user operation on the display 3 via the electronic pen 4. For example, the user operation causing the event may be a touch on the display 3 with the tip or bottom of the electronic pen 4.

The event classification unit 25 analyzes the event detected by the coordinate detection unit 22, and the event detected by the contact detection unit 24, to classify the detected events into a stroke drawing, a user interface (UI) operation, and a gesture operation.

In the description of the present embodiment, the "stroke drawing" is defined as an event of which a user has the electronic pen 4 to press on the display 3, moves the electronic pen 4 on the display 3 while the electronic pen 4 is in contact with the display 3, and separates the electronic pen 4 from the display 3. The event, which is the stroke drawing, occurs while a stroke image (B) illustrated in FIG. 17 is being displayed on the display 3. A description of the stroke image (B) is given later. With such the stroke drawing, an alphabet "S" or "T" is drawn on the display 3, for example. The stroke drawing may not only include the case of drawing an image, but include an operation of deleting a part of a drawn image, or editing a part of a drawn image.

The "UI operation" is defined as an event of which a user presses a certain point or an area with the electronic pen 4 or the user's hand H, while a UI image (A) illustrated in FIG. 17 is being displayed on the display 3. A description of the UI image (A) is given later. With this UI operation, for example, a color or a width of a line to be used for drawing with the electronic pen 4 is settable.

The "gesture operation" is defined as an event of which a user touches the display 3 by user's hand H or the user moves the user's hand H on the display 3 while the user's hand H is in contact with the display 3. The event, which is the gesture operation, occurs while the stroke image (B) illustrated in FIG. 17 is being displayed. With the gesture operation, the user is able to enlarge or reduce a size of an image being displayed, change a display size, or switch pages by moving the user's hand H being in contact with the display 3, for example.

The operation processing unit 26 performs various types of operation, with respect to an event that is determined as the UI operation by the event classification unit 25, according to an UI element that is used to causes the event. Examples of such a UI element include, but not limited to, a key (button), a list, a check box, and a text box. The gesture processing unit 27 performs operation corresponding to an event that is determined as the gesture operation by the event classification unit 25.

The event classification unit 25, the operation processing unit 26, the gesture processing unit 27, and the stroke processing unit 32 are included in an operation reception unit 99 that receives a user operation.

The video image superimposing unit 28 displays an image superimposed by a display superimposing unit 36, which is described later, as a video image on the display 3 or the like. Further, the video image superimposing unit 28 generates a picture-in-picture screen by combining, for example, a video image from the laptop PC 6 with another video image transmitted from the videoconference terminal 7. The video image superimposing unit 28 further switches from a picture-in-picture screen, which displays a video image on a part of the display 3, to a screen that displays the video image as the entire screen of the display 3.

The image processing unit 30 superimposes a plurality of image layers as illustrated in FIG. 17. The image processing unit 30 includes an image acquisition unit 31, a stroke processing unit 32, a UI image generation unit 33, a background generation unit 34, a layout management unit 35, a display superimposing unit 36, a page processing unit 37, a file processing unit 40, and page data storage unit 300 and a remote license management table 310.

The image acquisition unit 31 acquires each frame of the video image acquired by the video image acquisition unit 21, as an image. The image acquisition unit 31 outputs data representing the image to the page processing unit 37. The image corresponds to an output image (C), which is illustrated in FIG. 17, from the laptop PC 6, for example.

The stroke processing unit 32 draws an image, deletes at least a part of the image, or edits at least a part of the image, according to the stroke drawing that is classified by the event classification unit 25. The image related to the stroke drawing corresponds to the stroke image (B) illustrated in FIG. 17, for example. In addition, each result of drawing, deleting, or editing of the image according to the stroke drawing is stored in an operation data storage unit 840 as operation data, which is described later.

The UI image generation unit 33 generates an UI image that is set in advance to the display device 2. The UI image corresponds to the UI image (A) illustrated in FIG. 17, for example.

The background generation unit 34 receives, from the page processing unit 37, medium data that is data among from page data read by the page processing unit 37 from the page data storage unit 300. The background generation unit 34 outputs the received medium data to the display superimposing unit 36. An image based on the medium data corresponds to a background image (D) illustrated in FIG. 17. A pattern of the background image (D) is a solid pattern, a grid pattern, or the like.

The layout management unit 35 manages layout information that indicates a layout of an image output to the display superimposing unit 36 from each of the image acquisition unit 31, the stroke processing unit 32, and the UI image generation unit 33 (or the background generation unit 34). This allows the layout management unit 35 to instruct the display superimposing unit 36 whether or not to display the output image (C) or the stroke image (B) on the UI image (A) or the background image (D). When instructing to display the output image (C) or the stroke image (B) on the UI image (A) or the background image (D), the layout management unit 35 instructs the display superimposing unit 36 where on the UI image (A) or the background image (D) to display the output image (C) or the stroke image (B).

The display superimposing unit 36 determines, based on the layout information output the layout management unit 35, a layout of the images output from the image acquisition unit 31, the stroke processing unit 32, and the UI image generation unit 33 (or the background generation unit 34).

The page processing unit 37 combines data of the stroke image (B) and data of the output image (C) as page data to be stored in the page data storage unit 300. The data of the stroke image (B) is a part of the page data as stroke arrangement data (one or more data items of stroke data) indicated by a stroke arrangement data ID illustrated in FIG. 7. The data of the output image (C) is a part of the page data as medium data indicated by a medium data ID illustrated in FIG. 7. In addition, after being read from the page data storage unit 300, the medium data is treated as data of the background image (D).

Further, the page processing unit 37 transmits the medium data of the page data once stored to the display superimposing unit 36 via the background generation unit 34, so that the video image superimposing unit 28 displays the background image (D) on the display 3 again. In addition, the page processing unit 37 returns the stroke arrangement data (one or more data items of stroke data) among the page data to the stroke processing unit 32 so that the stroke is editable again. The page processing unit 37 further deletes or copies the page data.

That is, when the page processing unit 37 stores the page data in the page data storage unit 300, the data of the output image (C) being displayed on the display 3 is once stored in the page data storage unit 300. Then, when the data, which is once stored in the page data storage unit 300, is read, the data is read as the medium data that indicates the background image (D). Of the page data read from the page data storage unit 300, the page processing unit 37 outputs the stroke arrangement data representing the stroke image (B) to the stroke processing unit 32. Of the page data read from the page data storage unit 300, the page processing unit 37 further outputs the medium data representing the background image (D) to the background generation unit 34.

The display superimposing unit 36 superimposes the output image (C) output from the image acquisition unit 31, the stroke image (B) output from the stroke processing unit 32, the UI image (A) output from the UI image generation unit 33, and the background image (D) output from the background generation unit 34, with each other, according to the layout specified by the layout management unit 35.

Accordingly, as illustrated in FIG. 17, after the images are superimposed with each other, a layer configuration of the images is in the order of the UI image (A), the stroke image (B), the output image (C), and the background image (D). The order of the images is an order viewed from a user.

The display superimposing unit 36 may also superimpose one of the output image (C) and the background image (D) with the UI image (A) and the stroke image (B) and exclude the other one, by switching between the images, which are the output image (C) and the background image (D) illustrated in FIG. 17. For example, when the cable 10 connected between the display device 2 and the laptop PC 6 is disconnected in a state where the UI image (A) and the stroke image (B) and the output image (C) are displayed, the layout management unit 35 specifies a layout so that the output image (C) is excluded from superimposition targets, and the background image (D) is displayed. In the above-described case, the display superimposing unit 36 enlarges or reduces a display size, or moves a display area, of each one of the image layers.

The page data storage unit 300 stores page data as illustrated in FIG. 7. FIG. 7 is a conceptual diagram illustrating a data structure of the page data, according to the present embodiment. The page data includes data corresponding to one page to be displayed on the display 3. The data includes stroke arrangement data (one or more pieces of stroke data) and medium data. The page data includes various types of parameter. Content of the page data is described with reference to FIG. 7 to FIG. 10.

As illustrated in FIG. 7, the page data includes a page data ID for identifying a corresponding page, a start time indicating when display of a corresponding page is started, an end time indicating when rewriting to a corresponding page by stroke or gesture is ended, a stroke arrangement data ID for identifying a corresponding data item of stroke arrangement data generated by stroke using the electronic pen 4 or the user's hand H, and a corresponding data item of medium data ID for identifying a corresponding data item of medium data, which are stored in association with each other. The stroke arrangement data is to be used for displaying the stroke image (B) on the display 3, as illustrated in FIG. 17, which is described later. The medium data is to be used for displaying the background image (D) on the display 3, as illustrated in FIG. 16, which is described later.

By such page data, for example, in case the user draws the alphabet "S" with the electronic pen 4 in one stroke, one stroke data ID is assigned to the stroke drawing "S". When the user draws the alphabet "T" with the electronic pen 4 in two strokes, two stroke data IDs are assigned to the alphabet "T" to be identified.

The stroke arrangement data includes detailed information as illustrated in FIG. 8. FIG. 8 is a conceptual diagram illustrating a data structure of the stroke arrangement data, according to the present embodiment. As illustrated in FIG. 8, stroke arrangement data corresponding to a stroke or a set of strokes includes one or more pieces of stroke data, each corresponding to a single stroke. A piece of stroke data includes a stroke data ID for identifying the piece of stroke data, a start time when drawing of a corresponding stroke is started, an end time when drawing of the corresponding stroke is ended, a color of the corresponding stroke, a width of the corresponding stroke, and a coordinate arrangement data ID for identifying arrangement of points of the corresponding stroke.

Further, the coordinate arrangement data includes detailed information as illustrated in FIG. 9. FIG. 9 is a conceptual diagram illustrating a data structure of the coordinate arrangement data, according to the present embodiment. As illustrated in FIG. 9, the coordinate arrangement data includes a single point (X coordinate value, Y coordinate value) on the display 3, difference time (millisecond (ms)) indicating a difference between the time when the point is drawn and the start time when drawing of the corresponding stroke starts, and pressure by the electronic pen 4 on the single point. That is, one item of coordinate arrangement data in FIG. 8 is a collection of single points in FIG. 9. For example, when the user draws the alphabet "S" with the electronic pen 4 in one stroke, a plurality of points is to be touched by the electronic pen 4 that passes through a stroke line that is made by the plurality of points, and the coordinate arrangement data indicates information on the plurality of points of the stroke drawing accordingly.

The medium data of the page data in FIG. 7 includes detailed information as illustrated in FIG. 10. FIG. 10 is a conceptual diagram illustrating a data structure of the medium data, according to the present embodiment. As illustrated in FIG. 10, the medium data includes a medium data ID for identifying the medium data as managed with the table of FIG. 7, a type of the medium data, recording time when the medium data is recorded in the page data storage unit 300 by the page processing unit 37, a position of an image to be displayed on the display 3 based on the page data (X coordinate, Y coordinate), a size of the image (width, height), and data indicating content of the medium data, which are stored in association with each other. The position of the image to be displayed on the display 3 based on the page data indicates the upper left corner of that image, when the X and Y coordinates of the upper left corner of the display 3 are set to (0, 0).

Referring back to FIG. 4, the remote license management table 310 manages license data required to execute the remote sharing process. In the remote license management table 310, a product ID of the display device 2, a license ID for authentication, and an expiration date of the license are managed associated with each other, as illustrated in FIG. 11.

Functional Configuration of File Processing Unit

A description is given below of a functional configuration of the file processing unit illustrated in FIG. 4, with reference to FIG. 5. FIG. 5 is a block diagram illustrating the functional configuration of the file processing unit 40 according to the present embodiment.

The file processing unit 40 includes a recovery processing unit 41, a file input unit 42a, a file output unit 42b, a file conversion unit 43, a file transmission unit 44, an address book input unit 45, a backup processing unit 46, a backup output unit 47, a setting management unit 48, a setting file input unit 49a, and a setting file output unit 49b. Further, the file processing unit 40 includes an address book management table 410, a backup data storage unit 420, a setting file storage unit 430, and a connection destination management table 440.

The recovery processing unit 41 detects an abnormal termination after the display device 2 abnormally terminates, and recovers the unsaved page data. For example, in the case of normal termination, the page data is recorded as a PDF file in the USB 5 via the file processing unit 40, but in the case of abnormal termination such as when the power is turned off, the page data remains as being recorded in the page data storage unit 300. Accordingly, when the power is turned on again, the recovery processing unit 41 recovers by reading the page data from the page data storage unit 300.

The file input unit 42a reads a PDF file from the USB memory 5 and stores each page as page data in the page data storage unit 300.

The file conversion unit 43 converts the page data stored in the page data storage unit 300 into a PDF format file.

The file output unit 42b records the PDF file output from the file conversion unit 42 in the USB memory 5.

The file transmission unit 44 attaches the PDF file generated by the file conversion unit 43 to an electronic mail (e-mail) and transmits the PDF file. A destination of the file is determined by a user operation using an input device such as a touch panel. The user operation is performed with respect to the display 3 displaying details of the address book management table 410, which is displayed by the display superimposing unit 36. The user operation is received by the file transmission unit 44. In the address book management table 410, a name of destination and an e-mail address of destination are managed in association with each other, as illustrated in FIG. 12. Further, the file transmission unit 44 may also receive an input of an e-mail address as a destination performed by the user by using the input device such as the touch panel.

The address book input unit 45 reads a file of e-mail address list from the USB memory 5 and manages the e-mail address list in the address book management table 410.

The backup processing unit 46 backs up a file output by the file output unit 42b and a file transmitted by the file transmission unit 44 by storing the files in the backup data storage unit 420. In a case where the user does not set for backup, a backup process is not be performed. The backup data is stored in a PDF format as illustrated in FIG. 13.

The backup output unit 47 stores the backed up files in the USB memory 5. When a backed up file is stored, a password is input for security by a user operation of inputting using the input device such as a touch panel.

The setting management unit 48 stores in and reads from the setting file storage unit 430 various setting information of the display device 2, and thereby manages the various setting information. Examples of the various setting information include a network setting, a date and time setting, a region and language setting, a mail setting, an address book setting, a connection destination list setting, and a backup setting. The network setting include, for example, an internet protocol (IP) address setting for the display device 2, a netmask setting, a default gateway setting, and a Domain Name System (DNS) setting.

The setting file output unit 49b records the various setting information of the display device 2 in the USB memory 5 as a setting file (configuration file). Due to a security reason, the user is not able to view details of the setting file.

The setting file input unit 49a reads the setting file stored in the USB memory 5 and reflects the various setting information to the display device 2.

The connection destination list input unit 50 reads a list file of connection destination IP addresses for a remote sharing process from the USB memory 5 and manages the list in the connection destination management table 440. As illustrated in FIG. 14, the connection destination management table 440 is a table for managing in advance an IP address of the display device 2 that plays a role of a host terminal of a remote sharing process. With the connection destination management table 440, a user of another display device 2 that plays a role of a participant terminal to be participate in the remote sharing process, reduces a work of inputting the IP address of the host terminal. In the connection destination management table 440, a name of a site where the display device 2 that is able to participate in a remote sharing process as the host terminal is placed and an IP address of the display device 2 as the host terminal are managed in association with each other.

The connection destination management table 440 may not be provided. However, in this case, the user of the participant terminal is required to input the IP address of the host terminal by using the input device such as a touch panel in order to start the remote request process with the host terminal. Accordingly, the user of the participant terminal obtains the IP address of the host terminal from the user of the host terminal by telephone, e-mail, or the like.

Functional Configuration of Communication Control Unit

Figure 6:
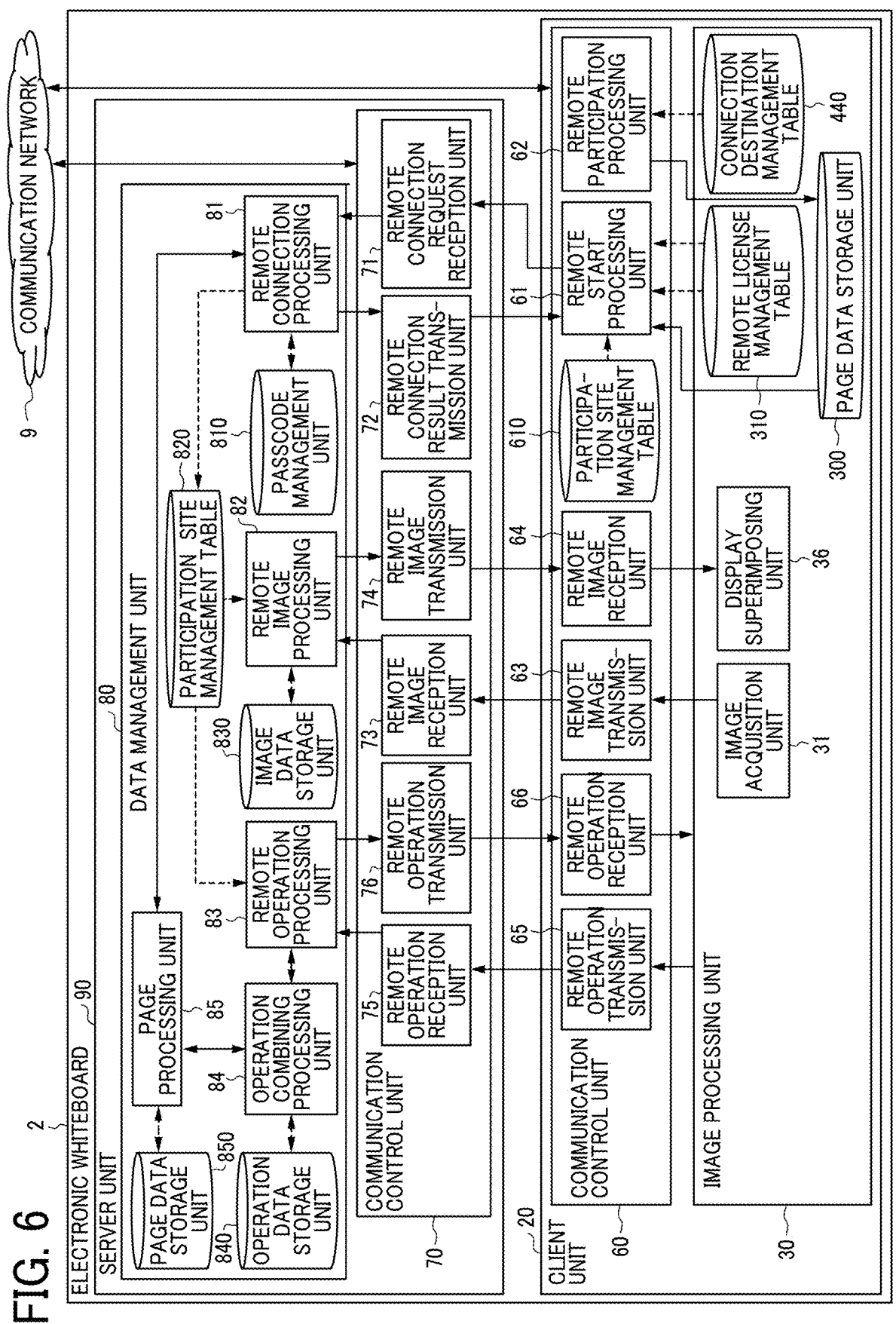
FIG. 6 is a block diagram illustrating a functional configuration of a server unit and a transmission control unit according to one or more embodiments.

A description is now given of a functional configuration of the communication control unit 60 according to the present embodiment, with reference to FIG. 6. In FIG. 6, an electronic whiteboard is used as an example of the display device 2. The communication control unit 60, which may be implemented by the instructions of the CPU 101, communicates with another display device 2 via the communication network 9 and communicates with a communication control unit 70, of which a detailed description is given later, in the server unit 90. The communication control unit 60 includes a remote start processing unit 61, a remote participation processing unit 62, a remote image transmission unit 63, a remote image reception unit 64, a remote operation transmission unit 65, a remote operation reception unit 66, and a participation site management table 610.

The remote start processing unit 61 requests to the server unit 90 of the same display device 2 to newly start a remote sharing process, and receives a result, which is a response to the request, from the server unit 90. In this case, the remote start processing unit 61 refers to the remote license management table 310. When the license information (product ID, license ID, and expiration date) is managed, the remote start processing unit 61 is able to request to start the remote sharing process. On the other hand, when the license information (product ID, license ID, and expiration date) is managed, the remote start processing unit 61 is not able to request to start the remote sharing process.

The participation site management table 610 is a table that manages the one or more other display devices 2 as participant terminals that are currently participating in the remote sharing process when the display device 2 is the host terminal. In the participation site management table 610, a name of a site where the display device 2 currently participating in is placed and an IP address of the display device 2 are managed in association with each other, as illustrated in FIG. 15.

The remote participation processing unit 62 transmits, through the communication network 9, a request for participation to the remote connection request reception unit 71 in the server unit 90 of the display device 2 that is the host terminal of the remote sharing process, which has been already started. In this case, the remote participation processing unit 62 refers to the remote license management table 310 as well. Further, in order to participate in the remote sharing process that has already been started, the remote participation processing unit 62 refers to the connection destination management table 440 and acquires the IP address of the display device 2, which is the participation destination. The IP address the display device 2, which is the participation destination, may be input by a user operation performed by using the input device such as a touch panel. In such a case, the connection destination management table may not be referred to by the remote participation processing unit 62.

The remote image transmission unit 63 transmits to the server unit 90 the output image (C) transmitted from the video image acquisition unit 21 via the image acquisition unit 31.

The remote image reception unit 64 receives, from the server unit 90, image data received from the laptop PC 6 connected to the other display device 2 and outputs the image data to the display superimposing unit 36 to enable the remote sharing process.

The remote operation transmission unit 65 transmits to the server unit 90 various operation data necessary for the remote sharing process. These various operation data include, information on adding a stroke, deleting a stroke, editing a stroke (enlarging, reducing, moving), storing page data, creating page data, duplicating page data, deleting page data, and switching pages being displayed, for example. Further, the remote operation reception unit 66 receives from the server unit 90 the operation data input by other display device 2 and outputs the operation data to the image processing unit 30 to perform the remote sharing process.

Functional Configuration of Server Unit

Subsequently, a functional configuration of the server unit 90 is described with reference to FIG. 6. The server unit 90 is provided in each display device 2, and any display device 2 serves as the server unit 90. The server unit 90 includes the communication control unit 70 and a data management unit 80.

Functional Configuration of Communication Control Unit

A functional configuration of the communication control unit 70 is described below. The communication control unit 70, which may be implemented by the instructions of the CPU 101, internally communicates with the communication control unit 60 of the client unit in the same display device 2 and communicates with another communication control unit 60 of the client unit 20 in another display device 2 through the communication network 9. The data management unit 80 manages operation data, image data, and the like.

In a detail, the communication control unit 70 includes a remote connection request reception unit 71, a remote connection result transmission unit 72, a remote image reception unit 73, a remote image transmission unit 74, a remote operation reception unit 75, and a remote operation transmission unit 76.

The remote connection request reception unit 71 receives a start request for a remote sharing process from the remote start processing unit 61, and receives a participation request for a remote sharing process from the remote participation processing unit 62. The remote connection result transmission unit 72 transmits to the remote start processing unit 61 a result that is a response to the start request for the remote sharing process, and transmits to the remote participation processing unit 62 a result that is a response to the participation request for the remote sharing process.

The remote image reception unit 73 receives the image data (data of the output image (C)) from the remote image transmission unit 63 and transmits the image data to the remote image processing unit 82, which is described later. The remote image transmission unit 74 receives the image data from the remote image processing unit 82, and transmits the image data to the remote image reception unit 64.

The remote operation reception unit 75 receives the operation data (data such as the stroke image (B)) from the remote operation transmission unit 65 and transmits the operation data to the remote operation processing unit 83, which is described later. The remote operation transmission unit 76 receives the operation data from the remote operation processing unit 83, and transmits the operation data to the remote operation reception unit 66.

Functional Configuration of Data Management Unit

A description is now given of a functional configuration of the data management unit 80 according to the present embodiment, with reference to FIG. 6. The data management unit 80 includes a remote connection processing unit 81, a remote image processing unit 82, a remote operation processing unit 83, an operation combining processing unit 84, and a page processing unit 85. Further, the server unit 90 includes a passcode management unit 810, a participation site management table 820, an image data storage unit 830, the operation data storage unit 840, and a page data storage unit 850.

The remote connection processing unit 81 starts the remote sharing process and ends the remote sharing process. Further, the remote connection processing unit 81 checks the presence or absence of a license and whether the license is within a license period in a case of the presence of the license, based on the license information received by the remote connection request reception unit 71. The license information is received together with the remote sharing process start request from the remote start processing unit 61 or received together with the participation request for the remote sharing process from the remote participation processing unit 62. Further, the remote connection processing unit 81 checks whether the number of participation requests from the other display devices 2 as the client unit does not exceed a predetermined number of acceptable participations.

Further, the remote connection processing unit 81 determines whether a passcode transmitted when other display device 2 requests for participation in the remote sharing process is the same as the passcode managed by the passcode management unit 810. When a result of the determination indicates that the passcode is the same one, the remote connection processing unit 81 accepts (admit) the participation in the remote sharing process. The passcode is issued by the remote connection processing unit 81 when the remote sharing process is newly started, and the user of the display device 2 as a participant terminal being to participate in the remote sharing process obtains the passcode from the user of the display device 2 as the host terminal by telephone, e-mail, or the like. Accordingly, the user of the participant terminal who is to participate in the remote sharing process input the passcode for the participation request to the participant terminal by using the input device such as a touch panel, and then the participation is admitted. The user's usability may be prioritized over security, and in such a case, the license status alone may be checked without checking the passcode.

When the display device 2 is the host terminal, the remote connection processing unit 81 stores, in the participation site management table 820 of the server unit 90, the participation site information included in the participation request sent from the remote participation processing unit 62 of the participant terminal via the communication network 9. Then, the remote connection processing unit 81 reads out the remote site information stored in the participation site management table 820 and transmits the remote site information to the remote connection result transmission unit 72. The remote connection result transmission unit 72 transmits the remote site information to the remote start processing unit 61 in the client unit 20 of the same host terminal. The remote start processing unit 61 stores the remote site information in the participation site management table 610. Accordingly, in the host terminal, the remote site information is managed by both the client unit 20 and the server unit 90.

The remote image processing unit 82 receives the image data (output image (C)) from the laptop PC 6 connected to the client unit (including the client unit of the own display device 2, which is the host terminal) of each display device 2 performing the remote sharing process and stores the received image data in the image data storage unit 830. At the substantially same time, the remote image processing unit 82 determines a display order of the image data to be shared in the remote sharing process in an order of being received by the server unit 90 of the own display device 2, which is the host terminal. Further, the remote image processing unit 82 refers to the participation site management table 820 and transmits, via the communication control unit 70 (remote image transmission unit 74), the image data in the determined order to the client units (including the client unit of the own display device 2 which is the host terminal) 20 of all the display devices 2 participating in the remote sharing process.

The remote operation processing unit 83 receives various operation data such as a stroke image (for example, the stroke image (B)) drawn by the client unit (including the client unit of the own display device 2, which is the host terminal) of each display device 2 performing the remote sharing process, and determines a display order of images to be shared in the remote sharing process in an order of being received by the server unit 90 of the own display device 2, which is the host terminal. The various operation data is the same as the above-mentioned various operation data. Further, the remote operation processing unit 83 refers to the participation site management table 820 and transmits the operation data to the client units 20 (including the client unit of the own display device 2 which is the host terminal) of all the display devices 2 performing the remote sharing process.

The operation combining processing unit 84 assigns a global sequence to the operation data of each display device 2 output from the remote operation processing unit 83, stores the operation data in the operation data storage unit 840, and returns the operation data to the remote operation processing unit 83. The operation data is transmitted from the remote operation transmission unit 76 to the client unit of the display device 2 that is the host terminal and the client units of the display devices 2 which are the participant terminals, so that the image according to the same operation is displayed on each display device 2. Accordingly, the operation data storage unit 840 is shared by the client unit of each display device 2.

The page processing unit 85 has substantially the same function as the page processing unit 37 in the image processing unit 30 of the client unit 20, and stores the page data illustrated in FIG. 7 to FIG. 10 in the page data storage unit 850 in the server unit 90 as well. Since the page data storage unit 850 has the same content as the page data storage unit 300 in the image processing unit 30, the description thereof is omitted.

FIG. 16 is a conceptual diagram illustrating an example of an operation data management table stored in the operation data storage unit 840, according to the present embodiment. The operation data management table stores and manages, for each session ID identifying a session to perform mutual communication between display devices 2 participating in the same conference, the operation data and image data, which include various information and are shared by the display devices 2.

The data indicated by the operation data management table includes an ID for identifying a data record (piece of data), a sequence number (global sequence number) indicating a data record-generation order, information (body)

indicating content of the data record, and information (parent) for identifying parent data. For example, in a case of a data record of conference data, which indicates a remote conference being conducted with the plurality of display devices 2, the operation data management table includes a conference ID (session ID) for identifying the conference being executed, information (children) on pages generated by the conference, and information (current page) on a page configuring a display screen being currently displayed on the display device 2. In addition, the operation data management table includes, as a data record of page data, a page ID for identifying the page (page data) and a uniform resource locator (URL) indicating a storage location of background image data configuring the page, for example.

In addition, the operation data management table includes, as a data record of stroke data, a stroke ID for identifying the stroke data generated by a "stroke drawing" event, information (body) indicating the content of the stroke data, and information (parent) for identifying a parent page (page data), for example. In this case, the information (body) indicating the content of the stroke data includes a color of a corresponding drawn stroke, a width indicating a width of a line of the corresponding drawn stroke, and vertexes (x, y) of the corresponding drawn stroke. With the operation data management table described above, the display device 2 manages various types of data, including the stroke data, related to a shared screen generated for a videoconference executed using a specific communication session.

Operation or Processes of Embodiment

Figure 18:
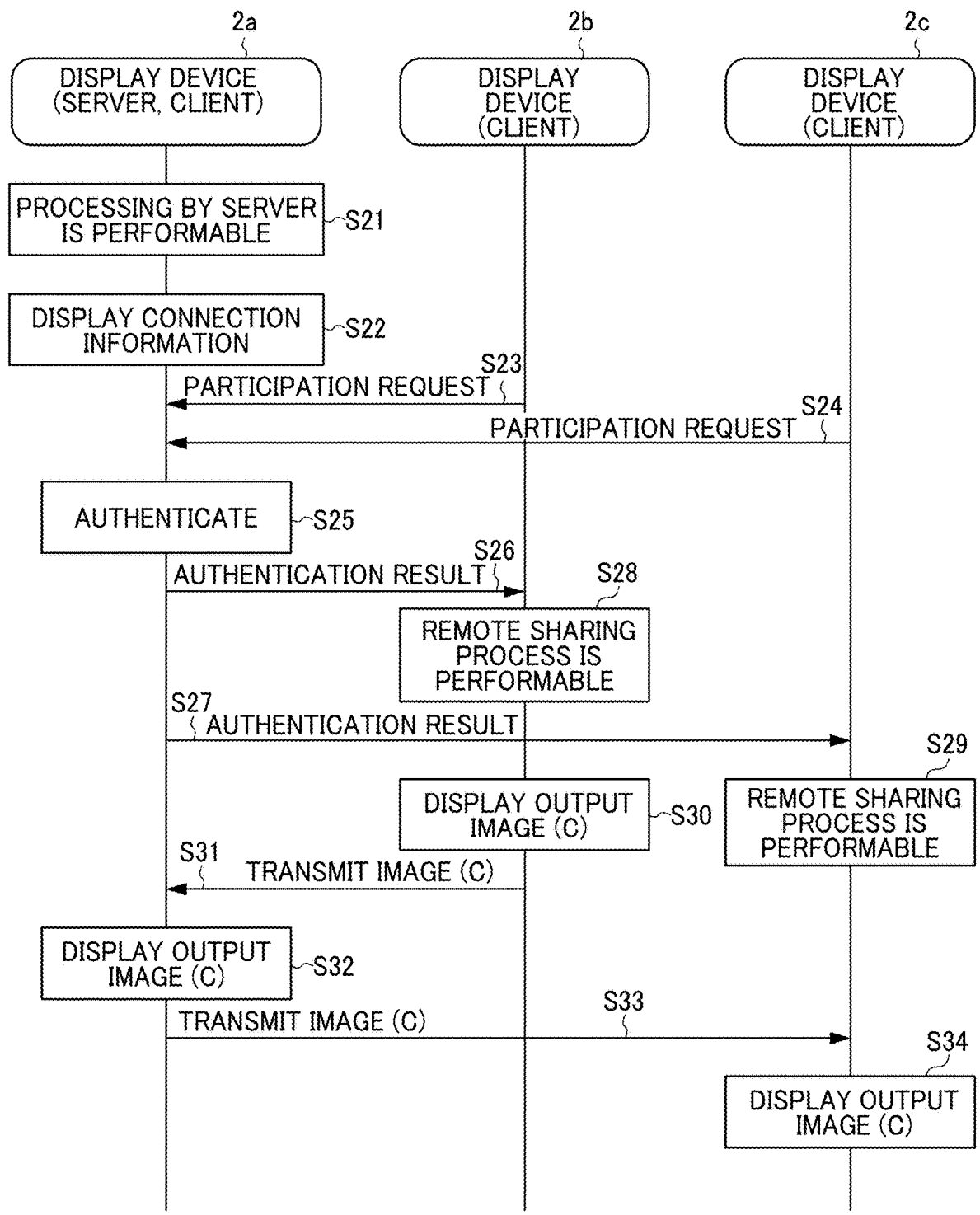
FIG. 18 is a sequence diagram illustrating a process performed by a plurality of display devices according to one or more embodiments.
Figure 19:
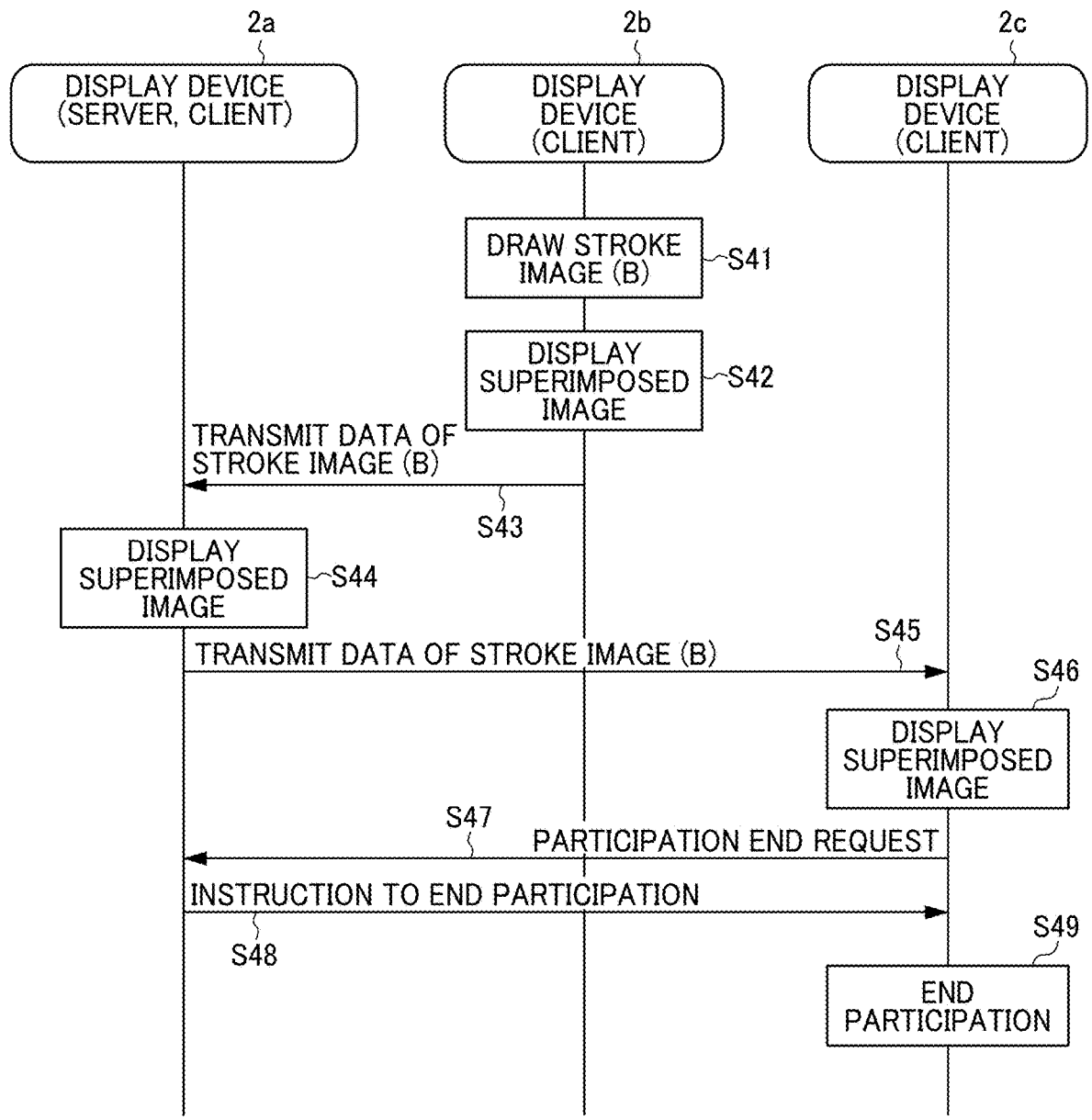
FIG. 19 is a sequence diagram illustrating a process performed by a plurality of display devices according to one or more embodiments.

Referring now to FIG. 18 and FIG. 19, a description is given of an operation or processes according to the present embodiment. FIG. 18 and FIG. 19 are sequence diagrams each of which illustrates a process performed by the plurality of display devices 2, according to the present embodiment.

In the description of the exemplary embodiment illustrated in FIGS. 18 and 19, the display device 2a plays a role as the host terminal (server unit and client unit) for hosting, or conducting the remote sharing process, and the display devices 2b and 2c that participate in the remote sharing process plays a role as the participant terminals (client unit). The displays 3a, 3b, and 3c are connected to the display devices 2a, 2b, and 2c, respectively, and the laptop PCs 6a, 6b, and 6c are further connected to the display devices 2a, 2b, and 2c, respectively. Further, for the display devices 2a, 2b and 2c, electronic pens 4a, 4b and 4c are used, respectively.

Participation Process

Referring to FIG. 18, a process for participating of the display devices 2b and 2c in the remote sharing process is described below.

When the user turns on the power switch of the display device 2a, the client unit 20 of the display device 2a is activated. Then, when the user operates the input device such as a touch panel to activate the server unit 90, the remote start processing unit 61 of the client unit transmits to the remote connection request reception unit 71 in the server unit 90 of the same display device 2a an instruction to start the operation of the server unit 90. Accordingly, the display device 2a is able to start various processing by the server unit 90, in addition to processing by the client unit 20 (step S21).

Subsequently, the UI image generation unit 33 in the client unit 20 of the display device 2a generates connection information for establishing a connection with the display device 2a, and the video image superimposing unit 28 displays, on the display 3a, the connection information obtained from the UI image generation unit 33 via the display superimposing unit 36 (step S22). The connection information includes an IP address of the host terminal, and a passcode that is generated for the remote sharing process. The passcode, which is stored in the passcode management unit 810, is read by the remote connection processing unit 81 illustrated in FIG. 6 and transmitted to the remote connection result transmission unit 72 and then to the remote start processing unit 61. Further, the passcode is transmitted from the communication control unit 60 including the remote start processing unit 61 to the image processing unit 30 illustrated in FIG. 4, and finally input to the UI image generation unit 33. As a result, the connection information includes the passcode. The connection information is informed to the users of the display devices 2b and 2c by the user of the display device 2a using, for example, telephone or an electronic mail. In addition, with the connection destination management table 440, a participant terminal is able to transmit a participation request even when the connection information does not include the IP address of the host terminal.

Next, in each of the display devices 2b and 2c, in response to receiving the connection information input using the input device such as the touch panel operated by each user, the remote participation processing unit 62 in the client unit 20 of each of the display devices 2a and 2b requests for the participation (transmit a participation request) by transmitting to the communication control unit 70 in the server unit 90 of the display device 2a through the communication network 9 a passcode based on the IP address (steps S23 and S24). Accordingly, the remote connection request reception unit 71 in the communication control unit 70 receives the participation request (including the passcode) from each of the display devices 2b and 2c, and outputs the passcode to the remote connection processing unit 81.

Next, the remote connection processing unit 81 authenticates the passcodes received from the display devices 2b and 2c using the passcodes managed by the passcode management unit 810 (step S25). Then, the remote connection result transmission unit 72 notifies the client unit 20 of each of the display devices 2b and 2c of an authentication result (steps S26 and S27). When each authentication result indicates that the corresponding one of the display device 2b and 2c is authenticated in S25, a communication between the display device 2a, which is the host terminal, and the display devices 2b and 2c, which are the participant terminals, is established, and the remote participation processing unit 62 in the client unit 20 of each of the display devices 2b and 2c causes the corresponding display device 2 to be able to start the remote sharing process executed between the other display devices 2 (steps S28 and S29).

Display of Output Image

A description is given below of a process of displaying the output image (C) in the remote sharing process with reference to FIG. 18.

First, the display device 2b displays the output image (C) on the display 3b (step S30). Specifically, the image acquisition unit 31 of the display device 2b receives the data of the output image (C) being displayed on the laptop PC 6b from the laptop PC 6b via the video image acquisition unit 21, and transmits the data to the display 3b via the display superimposing unit 36 and the video image superimposing unit 28. Thereby the display 3b displays the output image (C).

Subsequently, the image processing unit 30 including the image acquisition unit 31 of the display device 2b transmits the data of the output image (C) to the remote image transmission unit 63, so that the communication control unit 60 including the remote image transmission unit 63 transmits the data of the output image (C) to the communication control unit 70 of the display device 2a, which is the host terminal, through the communication network 9 (step S31). Accordingly, the remote image reception unit 73 of the display device 2a receives the data of the output image (C) and outputs the data to the remote image processing unit 82, so that the remote image processing unit 82 stores the data of the output image (C) in the image data storage unit 830.

Next, the display device 2a, which is the host terminal, displays the output image (C) on the display 3a (step S32). Specifically, the remote image processing unit 82 of the display device 2a outputs the data of the output image (C) received from the remote image reception unit 73 to the remote image transmission unit 74. The remote image transmission unit 74 outputs the data of the output image (C) to the remote image reception unit 64 in the client unit 20 of the same display device 2a, which is the host terminal. The remote image reception unit 64 outputs the data of the output image (C) to the display superimposing unit 36. The display superimposing unit 36 outputs the data of the output image (C) to the video image superimposing unit 28. The video image superimposing unit 28 outputs the data of the output image (C) to the display 3a. As a result, the display 3a displays the output image (C).

Next, the communication control unit 70 including the remote image transmission unit 74 in the server unit 90 of the display device 2a as the host terminal transmits the data of the output image (C) to the communication control unit 60 of the display device 2c, which is other than the display device 2b which is the transmission source of the data of the output image (C), through the communication network 9 (step S33). Accordingly, the remote image reception unit 64 of the display device 2c, which is the participant terminal, receives the data of the output image (C).

Subsequently, the display device 2c displays the output image (C) on the display 3c (step S34). Specifically, the remote image reception unit 64 of the display device 2c outputs the data of the output image (C) received in step S33 to the display superimposing unit 36 of the display device 2c. The display superimposing unit 36 outputs the data of the output image (C) to the video image superimposing unit 28. The video image superimposing unit 28 outputs the data of the output image (C) to the display 3c. As a result, the display 3c displays the output image (C).

When the data of the UI image (A) and the stroke image (B) are input to the display superimposing unit 36 in addition to the data of the output image (C), the display superimposing unit 36 generates a superimposed image (A, B, C), and the video image superimposing unit 28 outputs data of the superimposed image (A, B, C) to the display 3c. When data of a video (E) for the videoconference is sent from the videoconference terminal 7 to the video image superimposing unit 28, the video image superimposing unit 28 superimposes the data of the video (E) for the videoconference with the superimposed image (A, B, C) by the picture-in-picture and outputs to the display 3c.

Display of Superimposed Image

Referring to FIG. 19, a process of displaying a superimposed image in the sharing processing is described below.

First, in the display device 2b, the user draws the stroke image (B) on the display device 2b using the electronic pen 4b (step S41).

Subsequently, the display superimposing unit 36 of the display device 2b superimposes the stroke image (B) on the UI image (A) and the output image (C), and the video image superimposing unit 28 displays the superimposed image (A, B, C) on the display 3b of the display device 2b, as illustrated in FIG. 17 (step S42). Specifically, the stroke processing unit 32 of the display device 2b receives the data of the stroke image (B), which is the operation data, from the coordinate detection unit 22 and the contact detection unit 24 via the event classification unit 25, and transmits to the display superimposing unit 36. As a result, the display superimposing unit 36 superimpose the stroke image (B) on the UI image (A) and the output image (C), and the video image superimposing unit 28 displays on the display 3b of the display device 2b, the superimposed image (A, B, C).

Next, the image processing unit 30 including the stroke processing unit 32 of the display device 2b transmits the data of the stroke image (B) to the remote operation transmission unit 65, so that the remote operation transmission unit 65 of the display device 2b transmits the data of the stroke image (B) to the communication control unit 70 of the display device 2a, which is the host terminal, through the communication network 9 (step S43). Accordingly, the remote operation reception unit 75 of the display device 2a receives the data of the stroke image (B) and outputs the data of the stroke image (B) to the remote operation processing unit 83, so that the remote operation processing unit 83 outputs the data of the stroke image (B) to the operation combining processing unit 84. As described above, the data of the stroke image (B) drawn on the display device 2b is sequentially transmitted to the remote operation processing unit 83 of the display device 2a, which is the host terminal, each time a stroke is drawn. The data of the stroke image (B) is data identified by each stroke data ID illustrated in FIG. 8. Accordingly, for example, as described above, when the user draws the alphabet "T" with the electronic pen 4, the drawing is performed in two strokes, and the data of the stroke image (B) indicated by one of the two stroke data ID and the data of the stroke image (B) indicated by the other one of the two stroke data ID are sequentially transmitted.

Next, the display device 2a, which is the host terminal, displays, on the display 3a, the superimposed image (A, B, C) including the data of the stroke image (B) transmitted from the display device 2b (step S44). Specifically, the operation combining processing unit 84 of the display device 2a combines the data of the plurality of stroke images (B) sequentially sent via the remote operation processing unit 83, and stores the combined data in the operation data storage unit 840 and returns the data to the remote operation processing unit 83. Accordingly, the remote operation processing unit 83 outputs, to the remote operation transmission unit 76, the data of the stroke image (B) received from the operation combining processing unit 84 after the data is combined. The remote operation transmission unit 76 outputs, to the remote operation reception unit 66 in the client unit 20 of the display device 2a, which is the same host terminal, the data of the stroke image (B) after the data is combined. The remote operation reception unit 66 outputs, to the display superimposing unit 36 in the image processing unit 30, the data of the stroke image (B) after the data is combined. Accordingly, the display superimposing unit 36 superimposes, with the UI image (A) and the output image (C), the stroke image (B) of which the data is combined. Finally, the video image superimposing unit 28 displays the superimposed image (A, B, C) superimposed by the display superimposing unit 36 on the display 3a.

Next, the communication control unit 70 including the remote operation transmission unit 76 in the server unit 90 of the display device 2a, which is the host terminal transmits, to the communication control unit 60 of the display device 2c, which is other than the display device 2b that is the transmission source of the data of the stroked image (B), the data of the stroke image (B) of which the data is combined, through the communication network 9 (step S45). Accordingly, the remote operation reception unit 66 of the display device 2c, which is the participant terminal, receives the data of the stroke image (B) of which the data is combined.

Next, the display device 2c displays the superimposed image (A, B, C) on the display 3c (step S46). Specifically, the remote operation reception unit 66 of the display device 2c outputs the data of the stroke image (B) of which the data is combined to the image processing unit 30 of the display device 2c. The data of the stroke image (B) of which the data is combined is received in step S45. The display superimposing unit 36 of the image processing unit 30 superimposes, with the data of the UI image (A) and the output image (C), the data of the stroke image (B) of which the data is combined, and outputs the superimposed image (A, B, C) to the video image superimposing unit 28. The video image superimposing unit 28 outputs the data of the superposed image (A, B, C) to the display 3c. As a result, the display 3c displays the superimposed image (A, B, C).

In the above-described process, the output image (C) is displayed on the display 3, but the background image (D) may be displayed instead of the output image (C). Further, without excluding one of the output image (C) and the background image (D), both the output image (C) and the background image (D) may be displayed on the display 3 at the same time.

End of Participation

A description is given below of a process in which a participant terminal ends the participation in the remote sharing process, with reference to FIG. 19. In the exemplary embodiment in FIG. 19, the process in which the display device 2c ends the participation is illustrated.

First, when the display device 2c receives a participation end request by a user operation performed with an input device such as a touch panel, the remote participation processing unit 62 transmits the participation end request to the communication control unit 70 in the server unit 90 of the display device 2a, which is the host terminal (step S47). As a result, the remote connection request reception unit 71 in the communication control unit 70 receives the participation end request from the display device 2c, and outputs the participation end request to the remote connection processing unit 81 together with the IP address of the display device 2c. Then, the remote connection processing unit 81 of the display device 2a delate, from the participation site management table 820, the IP address of the display device 2c, which transmits the participation end request, and a site name where the display device 2c is placed, based on the IP address transmitted from the remote connection request reception unit 71, and outputs to the remote connection result transmission unit 72 the IP of the display device 2c and a notification indicating the deletion.

Next, the communication control unit 70 including the remote connection result transmission unit 72 instructs the communication control unit 60 in the client unit 20 of the display device 2c to end the participation via the communication network 9 (step S48). As a result, the remote participation processing unit 62 of the communication control unit 60 in the display device 2c disconnects the communication of the remote sharing process, thereby performing the participation termination processing to end the participation (step S49).

Configuration of Display Device for Changing EDID

Figure 20:
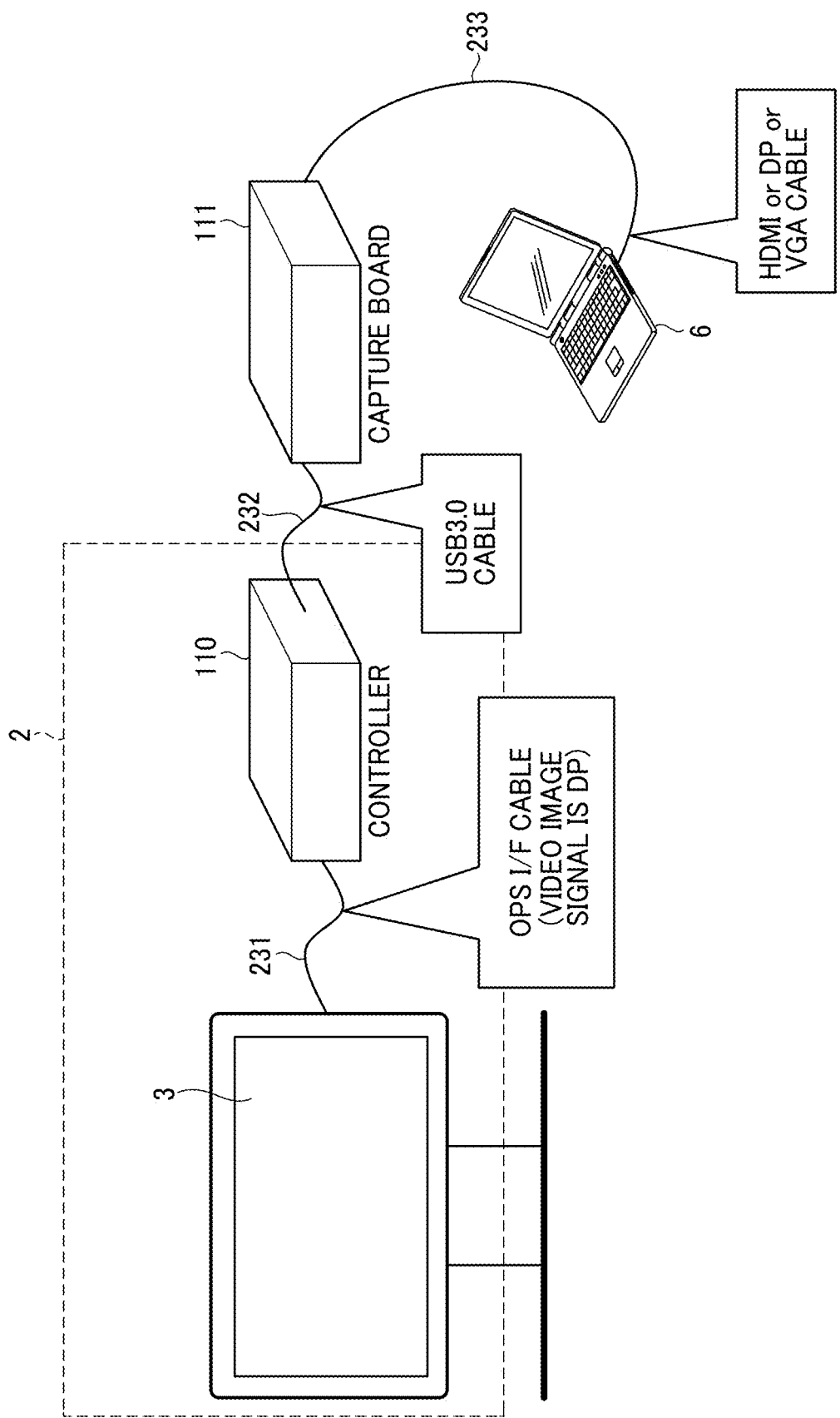
FIG. 20 is a schematic diagram illustrating an example of a configuration in which a display, a controller, and a capture board are extracted from the hardware configurations illustrated in FIG. 3, according to one or more embodiments.

A description is given below of a configuration, an operation, and a function of the display device 2 regarding a change of EDID with reference to FIG. 20. FIG. 20 is a schematic diagram illustrating an example of a configuration in which the display 3, the controller 110, and the capture board 111 are extracted from the hardware configurations illustrated in FIG. 3.

As illustrated in FIG. 20, the controller 110 is connected to the display 3 by a cable 231 and is connected to the capture board 111 by a cable 232. The capture board 111 is connected to the laptop PC 6 by a cable 233. The content data (video image or audio) output by the laptop PC 6 is received by the capture board 111 and transmitted to the controller 110. The controller 110 resizes as necessary the content data to be displayed on the display 3.

The controller 110 and the display 3 are connected by an oracle parallel server (OPS) I/F, which is an example of the cable 231, and internal content data is transmitted by a Display Port (registered trademark) included in the OPS I/F. The controller 110 and the capture board 111 are connected by USB 3.0, which is an example of the cable 232, and the content data and the control data are transmitted and received. The capture board 111 and the laptop PC 6 are connected by HDMI (registered trademark), Display Port (registered trademark) or VGA, which is an example of the cable 233, and capable of accepting the content data from the laptop PC 6.

The controller 110 and the capture board 111 are detachable from the display 3, and each of the display 3 and the capture board 111 is replaceable with another one by a user after the user purchases the display device 2. Since the capture board 111 is not included in the display device 2 at a time of the shipment of the display device 2 or is not connected even when being included in the display device 2, it is difficult for the seller to change the EDID of the capture board 111 to match the EDID of the display 3 at the time of shipment.

Figure 21A:
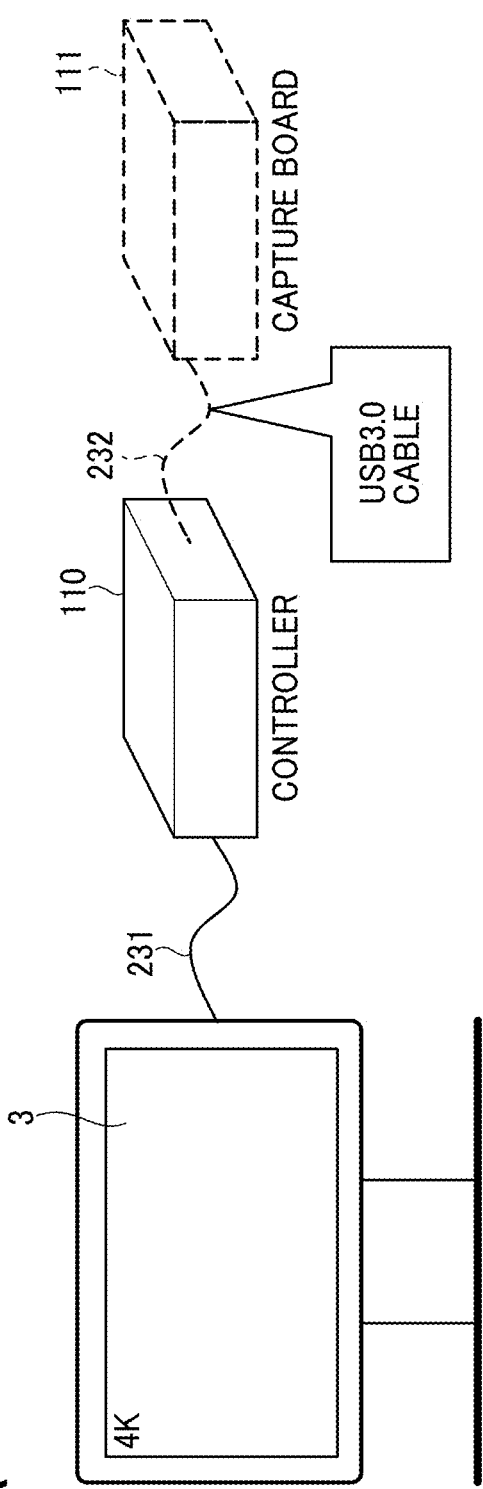
FIG. 21A and FIG. 21B are diagrams schematically illustrating a replacement of a capture board, according to one or more embodiments.
Figure 21B:
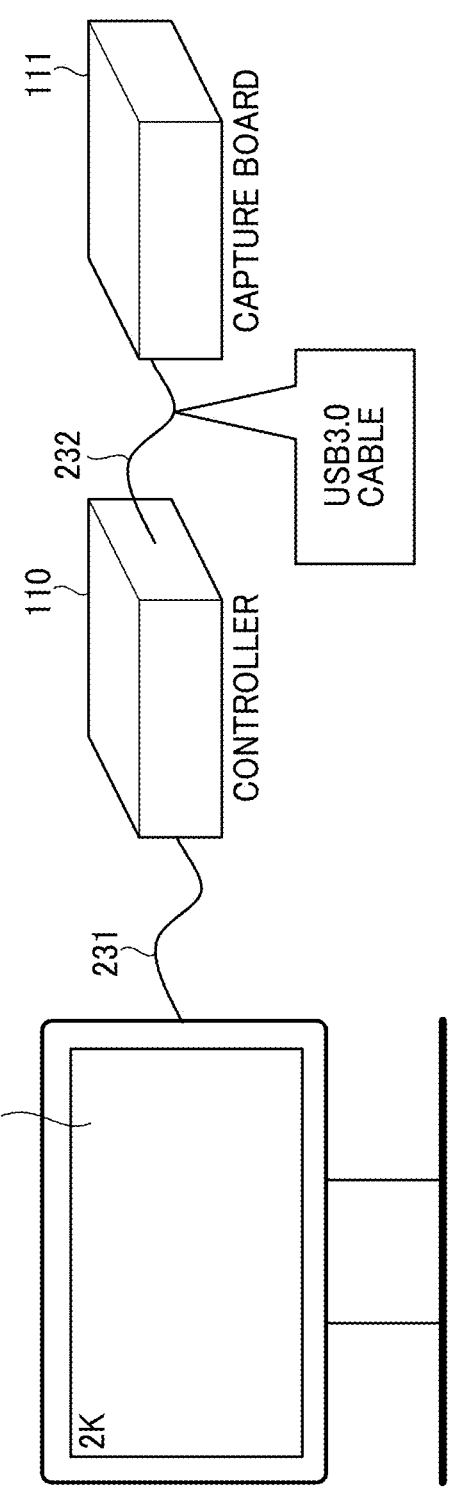

FIG. 21A and FIG. 21B are diagrams schematically illustrating a replacement of the capture board 111. The replacement of the capture board 111, which is connectable to the controller 110 with a USB cable, is performed easily. In FIG. 21A, the display 3 has a resolution of 4K. In FIG. 21B, the display 3 has a resolution of 2K. It is assumed that the maximum acceptable (supported) resolution of the capture board 111 is, for example, 4K (3840×2160). When the display 3 supports the resolution of 4K as illustrated in FIG. 21A, the controller 110 is capable of displaying a full screen of a video image from the laptop PC 6 without resizing. However, when the display 3 supports up to the resolution of 2K as illustrated in FIG. 21B, resizing the video image is required so that the controller 110 displays the full screen of the video image. Resizing the video image may increase the load on the CPU 101 or GPU 112 for a resizing process, or cause image deterioration. As described above, a combination in the display device 2, which is a combination of the controller 110, the display 3, and the capture board 111, is able to be changed. Inconvenience may occur depending on the combination.

Function Units of Display Device for Changing EDID

Figure 22:
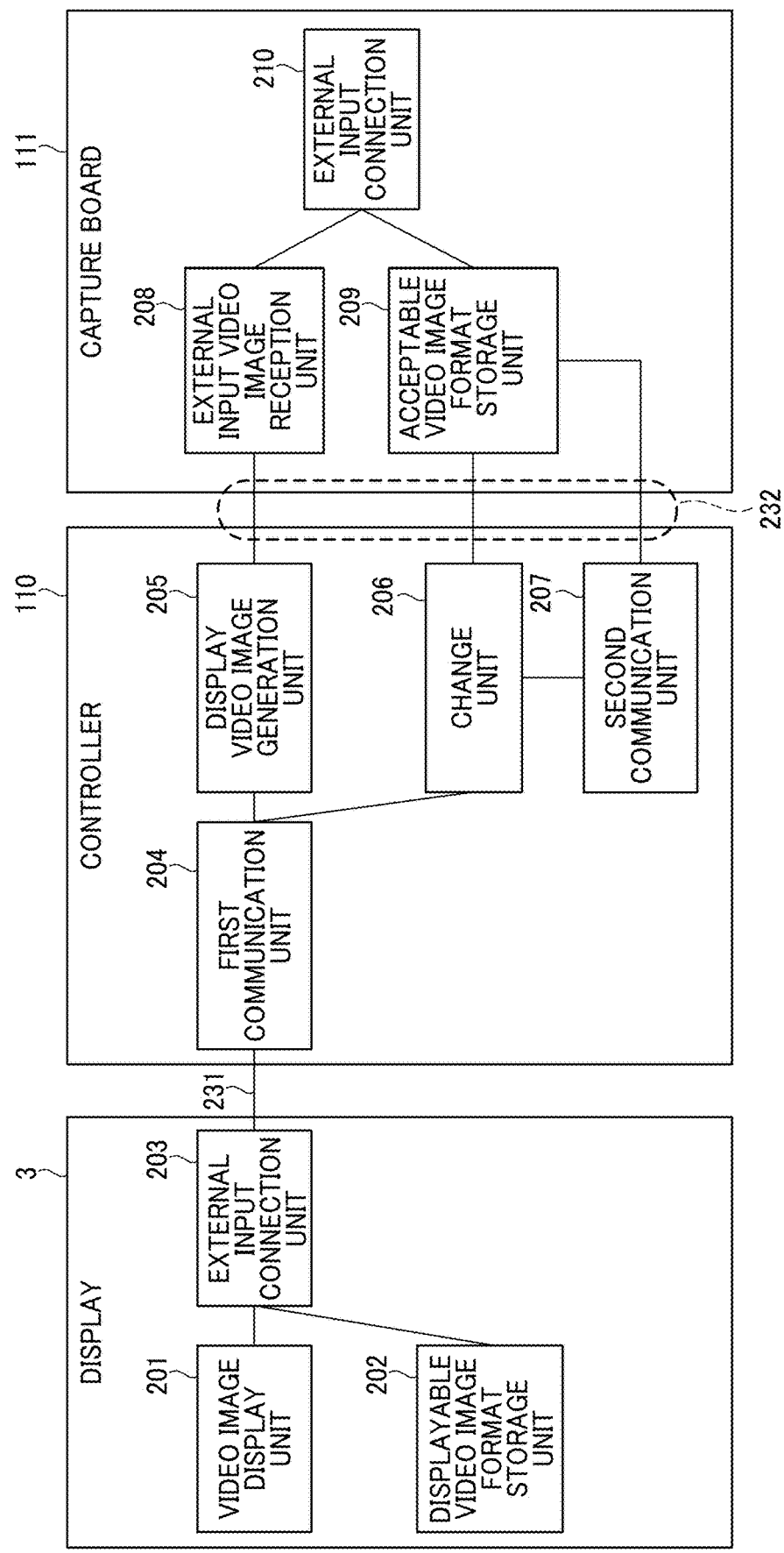
FIG. 22 is a block diagram illustrating a functional configuration of a display, a controller, and a capture board, according to one or more embodiments.

FIG. 22 is a block diagram illustrating a functional configuration of the display 3, the controller 110, and the capture board 111, according to the present embodiment. The display 3 includes a video image display unit 201, a displayable video image format storage unit 202, and an external input connection unit 203. The external input connection unit 203 is an interface for content data to which a terminal (end) of the cable 231 is connected. The external input connection unit 203 is communicably connected to a first communication unit 204 of the controller 110, and is capable of receiving the content data and transmitting displayable video image format such as resolution.

The displayable video image format storage unit 202 stores a video image format that is supported to be displayed (displayable) by the own device (display 3). The displayable video image format storage unit 202 stores, for example, EDID. When a device (controller 110 in the present embodiment) is connected to the external input connection unit 203, the external input connection unit 203 transmits the displayable video image format to the connected device, and thus the device obtains the displayable video image format.

The video image display unit 201 displays a video image received by the external input connection unit 203. The video image display unit 201 corresponds to a liquid crystal panel of the display 3, for example.

The controller 110 includes the first communication unit 204, a display video image generation unit 205, a change unit 206, and a second communication unit 207. Each function of the controller 110 is a function implemented by or caused to function by operating any of the hardware elements illustrated in FIG. 3 in cooperation with the instructions of the CPU 101 according to the control program expanded from the SSD 104 to the RAM 103.

The first communication unit 204 is a video image interface to which the terminal of the cable 231 is connected (an example of a first communication unit). The first communication unit 204 is communicably connected to the external input connection unit 203 of the display 3 to transmit the content data or receive a displayable video image format such as the resolution.

The display video image generation unit 205 blends a video image received from the capture board 111 with an operating system (OS). Blending is to combine the input video image with a window formed by an operating system, for example. For example, through blending, a dialog output by another application or the OS is displayed in the foreground with the video image that is displayed as a background. A size of the video image is not be preferably changed according to the size of the window the size (enlarge or reduce a scale of the video image is not preferably performed).

The second communication unit 207 receives an acceptable (supported) video image format from the capture board 111 (an example of a second communication unit). The change unit 206 compares the displayable video image format of the display 3 acquired from the display 3 via the external input connection unit 203 with the acceptable video image format acquired by the second communication unit 207 from the capture board 111. An optimum acceptable video image format is determined by a determination flow, which is described later, and the acceptable video image format of the capture board 111 is changed.

The capture board 111 includes an external input video image reception unit 208, an acceptable video image format storage unit 209, and an external input connection unit 210.

The external input connection unit 210 is an interface for the content data and is connected to a terminal (end) of the cable 233. The external input connection unit 210 is capable of receiving the content data from the laptop PC 6 or transmitting to the laptop PC 6 information on the acceptable video image format.

The external input video image reception unit 208 is an interface for the content data and is connected to a terminal (end) of the cable 232. The external input connection unit 210 is capable of transmitting the content data received from the laptop PC 6 to the controller 110. The external input video image reception unit 208 performs appropriate image processing (for example, conversion of RGB (color model of Red, Green, and Blue) to YUV) on the video image received from the laptop PC 6 via the external input connection unit 210, and then transmits the video image to the controller 110.

The acceptable video image format storage unit 209 holds, or stores, a video image format that is acceptable by the own device (capture board 111). The acceptable video image format storage unit 209 stores, for example, EDID. When a device (laptop PC 6 in the present embodiment) is connected to the external input connection unit 210, the external input connection unit 210 transmits the information on the acceptable video image format to the device, which is a connection destination.

<Information Included in EDID>

FIG. 23 is a diagram illustrating an example of the video image format stored by the displayable video image format storage unit 202 and the acceptable video image format storage unit 209, according to the present embodiment. Although the video image format stored in the displayable video image format storage unit 202 may be different from the video image format stored in the acceptable video image format storage unit 209, the EDID stored in the displayable video image format storage unit 202 and the acceptable video image format storage unit 209 is assumed to be the same in FIG. 23 for the sake of explanatory convenience.

The video image format illustrated in FIG. 23 may be included in the EDID. In FIG. 23, a horizontal resolution, a vertical resolution, and a refresh rate are illustrated as information items included in the EDID. As an example, a table illustrated in FIG. 23 indicates that video image formats of 720×400@70 Hz, 640×480@60 Hz, 800×600@60 Hz, 1024×768@60 Hz, 1280×960@60 Hz, 1280×1024@60 Hz, 1680×1050@60 Hz, 1600×1200@60 Hz, and 1920×1080@60 Hz are displayable or acceptable. That is, the maximum resolution is 1920×1080.

The EDID may include information item of model number of a main manufacture and power supply control items (Standby, Suspend, Active, etc.) of the display 3, although such information items are not included in the EDID illustrated in FIG. 23. Moreover, because the EDID is rewritable, a provider or the like may write arbitrary information in the EDID. For example, the capture board 111 may store a model number, a serial number, and the like of the capture board 111. By saving the EDID last acquired from the capture board 111, controller 110 is capable of detecting a replacement of the capture board by reading the EDID from the capture board 111. Accordingly, when the replacement of the capture board is detected, the controller 110 changes the EDID of the capture board 111.

<EDID Notification Method>

Figure 24:
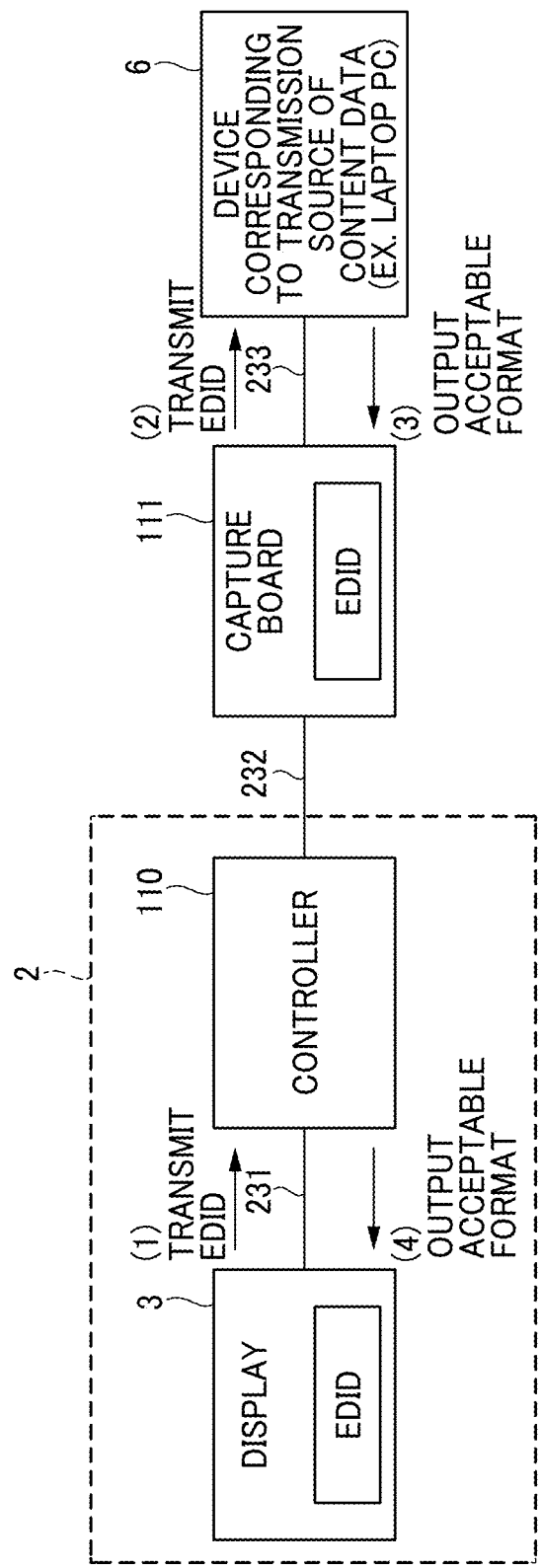
FIG. 24 is a diagram illustrating a notification flow in transmitting a video image by using EDID, according to one or more embodiments.

FIG. 24 is a diagram illustrating a notification flow in transmitting a video image by using the EDID, according to the present embodiment.

(1) The controller 110 acquires EDID from the display 3.

(2) The laptop PC 6 acquires EDID from the capture board 111.

(3) The laptop PC 6 outputs a video image at the maximum resolution that is supported by the EDID of the capture board 111.

(4) The controller 110 outputs a video image at the maximum resolution that is supported by the EDID of the display 3.

It should be noted that, the controller 110 and the laptop PC 6 may output the video image at an arbitrary resolution supported by the acquired EDID, according to a user operation.

Figure 25:
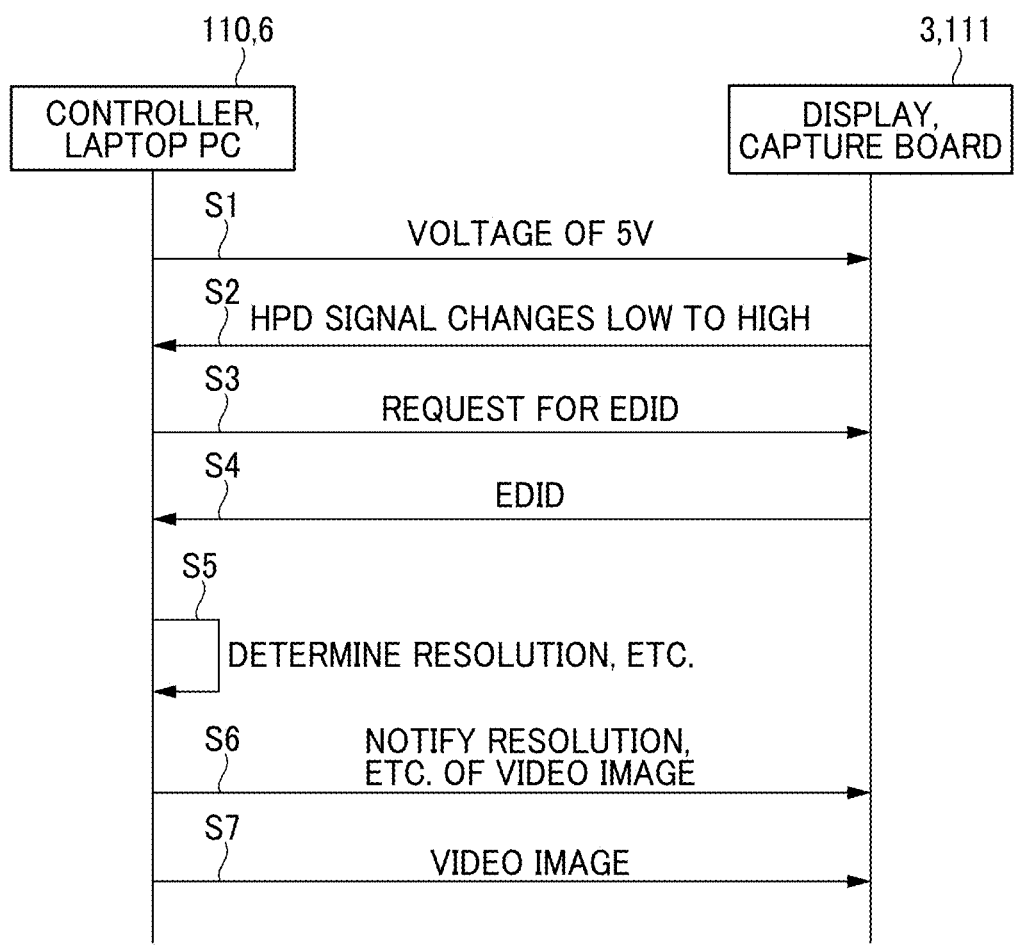
FIG. 25 is a sequence diagram illustrating an example of a general process in which a controller or a laptop PC acquires EDID from a display or a capture board and transmits a video image, according to one or more embodiments.

FIG. 25 is a sequence diagram illustrating an example of a general process in which the controller 110 or the laptop PC 6 acquires the EDID from the display 3 or the capture board 111 and transmits a video image. Note that in the example of FIG. 25, a case where an HDMI cable (registered trademark) is connected, but the same applies to other cables capable of transmitting digital signals.

S1: The display 3 and the controller 110, or the laptop PC 6 and the capture board 111 are physically connected to each other. Accordingly, a 5V current flows from the controller 110 or the laptop PC 6 to the display 3 or the capture board 111.

S2: On the display 3 or the capture board 111, a hot plug direct (HPD) signal changes from low to high to notify the controller 110 or the laptop PC 6 that the connection has been established.

S3: Upon checking the change in the HPD signal, the controller 110 or the laptop PC 6 requests for the EDID from the display 3 or the capture board 111.

S4: The display 3 or the capture board 111 transmits the EDID to the controller 110 or the laptop PC 6.

S5: The controller 110 or the laptop PC 6 determines the maximum resolution of the EDID that is able to be output by the own device.

S6: The controller 110 or the laptop PC 6 transmits the determined video image resolution and the like to the display 3 or the capture board 111.

S7: When the above-described steps are completed, the controller 110 or the laptop PC 6 transmits the video image to the display 3 or the capture board 111 at the determined resolution or the like. Although the video image is used in the description as an example in FIG. 25, the same applies to audio.

Specific Example of Video Image Transmission

Figure 26:
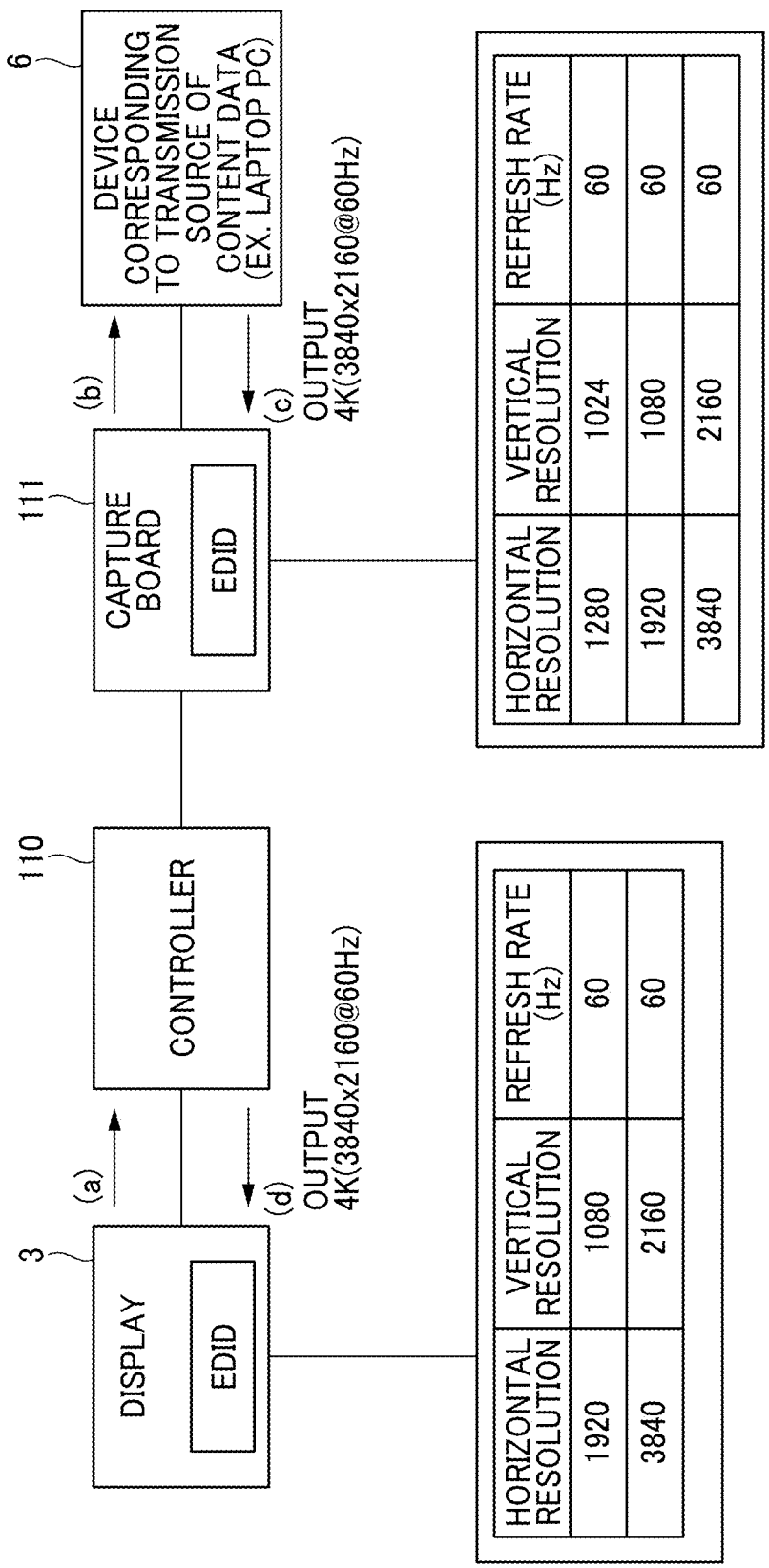
FIG. 26 is a diagram illustrating a case in which a display displays a video image that is transmitted from a laptop PC at a 4K resolution, at a 4K resolution, according to one or more embodiments.

FIG. 26 is a diagram illustrating a case in which the display 3 displays a video image that is transmitted from the laptop PC 6 at a 4K resolution, at the 4K resolution.

(a) The display 3 notifies the controller 110 that the display 3 is able to display a video image at the 4K resolution by transmitting the EDID of the display 3.

(b) The capture board 111 notifies the laptop PC 6 that the capture board 111 is able to display a video image at the 4K resolution by transmitting the EDID of the capture board 111.

(c) The laptop PC 6 transmits a 4K resolution video image to the capture board 111.

(d) The controller 110 transmits a 4K resolution video image to the display 3.

Figure 27:
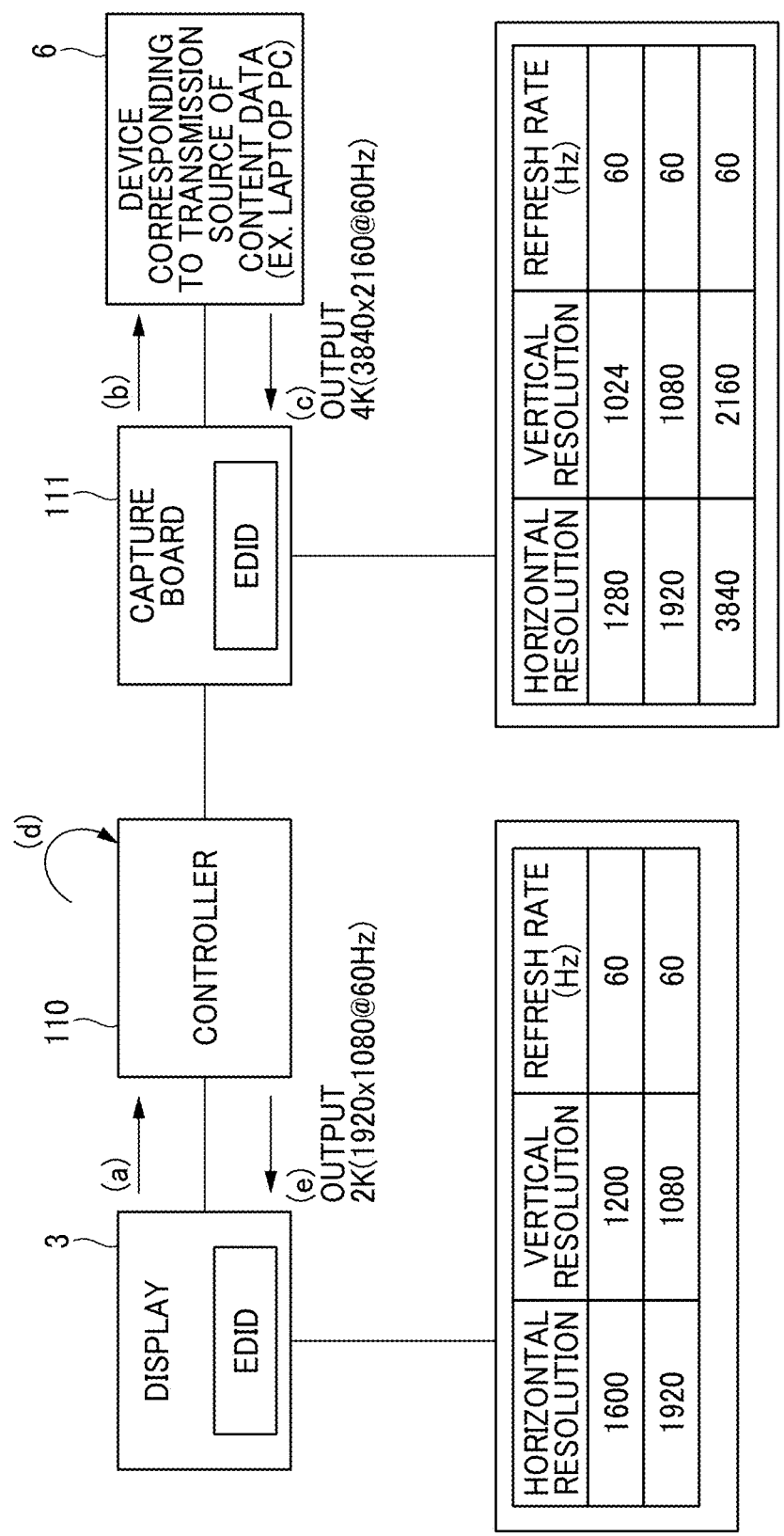
FIG. 27 is a diagram illustrating a case in which a display displays a video image that is transmitted from a laptop PC at a 4K resolution, at a 2K resolution, according to one or more embodiments.

FIG. 27 is a diagram illustrating another case in which the display 3 displays a video image that is transmitted from the laptop PC 6 at a 4K resolution, at a 2K resolution.

(a) The display 3 notifies the controller 110 that the display 3 is able to display a video image at the 2K resolution by transmitting the EDID of the display 3.

(b) The capture board 111 notifies the laptop PC 6 that the capture board 111 is able to display a video image at the 4K resolution by transmitting the EDID of the capture board 111.

(c) The laptop PC 6 transmits a 4K resolution video image to the capture board 111.

(d) Because the display 3 supports 2K, the controller 110 determines that the 4K resolution image is required to be converted into an image supported by 2K. Then, the image is resized to 2K (reduction of resolution).

(e) The controller 110 transmits the video image to the display 3 at 2K.

In the video transmission described with reference to FIG. 27, image deterioration due to resizing and an increase in the load on the CPU 101 and GPU 112 occur.

Figure 28:
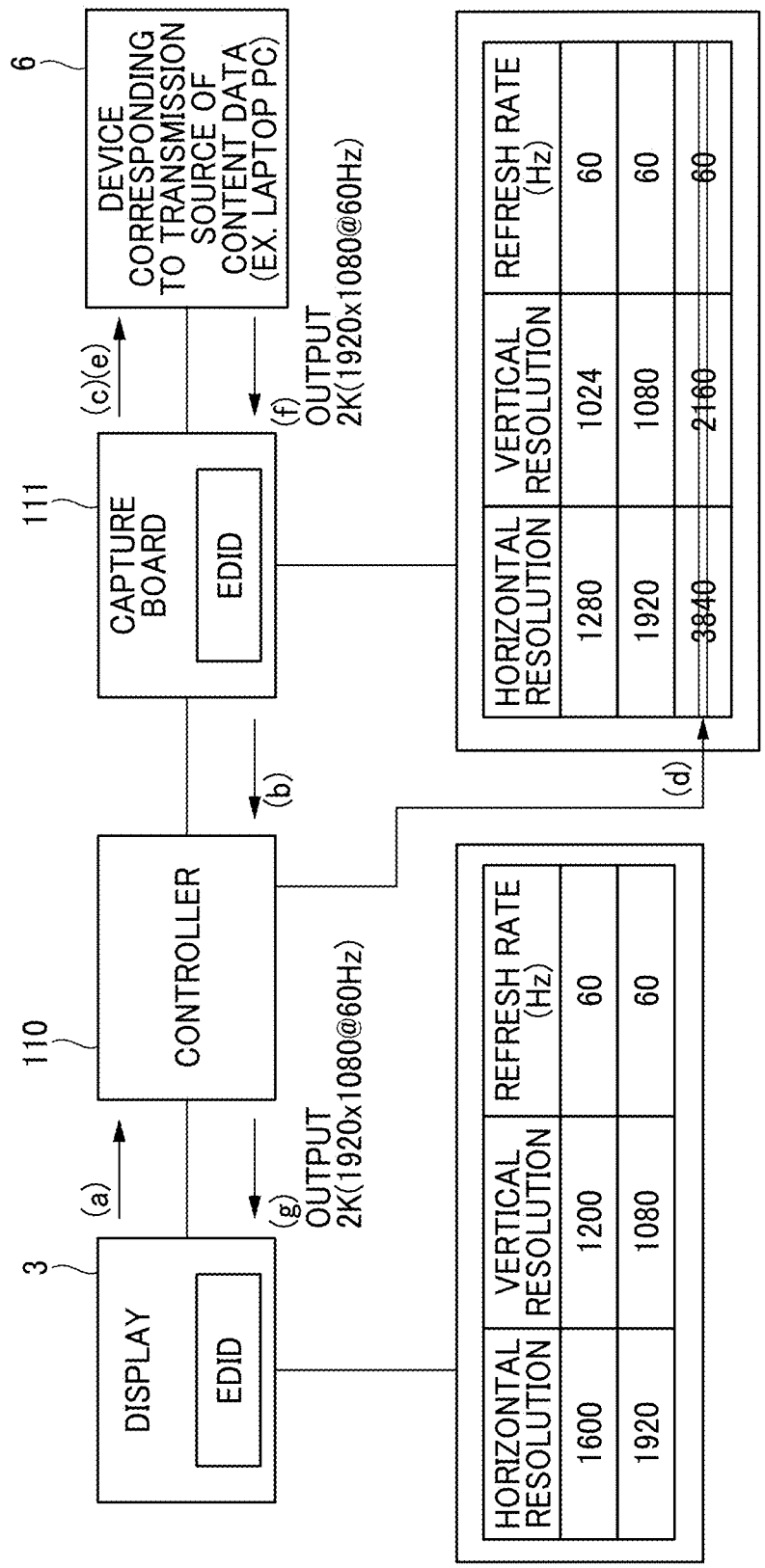
FIG. 28 is a diagram illustrating a case in which a display displays a video image that is transmitted from a laptop PC at a 2K resolution, at a 2K resolution, according to one or more embodiments.

FIG. 28 is a diagram illustrating a case in which the display 3 displays a video image that is transmitted from the laptop PC 6 at a 2K resolution, at the 2K resolution, according to the present embodiment.

(a) The display 3 notifies the controller 110 that the display 3 is able to display a video image at the 2K resolution by transmitting the EDID of the display 3.

(b) The controller 110 acquires information indicating that the capture board 111 is capable of displaying a video image at a 4K resolution from the capture board 111.

(c) The capture board 111 notifies the laptop PC 6 that the capture board 111 is able to display a video image at the 4K resolution by transmitting the EDID of the capture board 111.

(d) The controller 110 determines that the capture board 111 supports up to the 4K resolution though the display 3 supports up to the 2K resolution, and sets the maximum resolution of the EDID of the capture board 111 to be limited to the maximum resolution of the display 3. That is, 3840×2160@60 Hz is deleted from the EDID of the capture board 111 (the EDID is rewritten).

(e) The capture board 111 again notifies the laptop PC 6 that the capture board 111 is able to display a video image at the 4K resolution by transmitting the EDID of the capture board 111. The notification is not always performed again, and the cases are described separately.

When the laptop PC 6 is connected to the capture board 111 before the power supply of the display device 2 is turned on. The laptop PC 6 has already been notified of the EDID of the capture board 111. However, when the power supply of the controller 110 is turned on, the capture board 111 is also turned on, so that the laptop PC 6 detects the attachment or detachment of the cable by the ON signal. As a result, the laptop PC 6 is able to acquire the EDID from the capture board 111 again.

When the laptop PC 6 is connected to the capture board 111 after the power supply of the display device 2 is turned on. In this case, the laptop PC 6 acquires the changed EDID of the capture board 111 by connecting the cable. That is, step (c) is not performed.

(f) The laptop PC 6 transmits a video image to the capture board 111 at 2K based on the EDID acquired in step (e).

(g) The controller 110 determines that the display 3 supports 2K, and the received video image, which is 2K, is not required to be converted.

The controller 110 transmits the video image to the display 3 at 2K.

As described above, the controller 110 changes the EDID of the capture board 111, and thereby the controller 110 is capable of causing the display 3 to display the video image received from the capture board 111 without resizing the video image.

The EDID also includes resolutions having different aspect ratios. The controller 110 sets the maximum resolution of the display 3 to the capture board 111 among the resolutions having the same aspect ratio. The display 3 and the capture board 111 are designed so that there is not a case in which the EDIDs of the display 3 and the capture board 111 do not have the resolution having the same aspect ratio.

Resolution Determination Process

Figure 29:
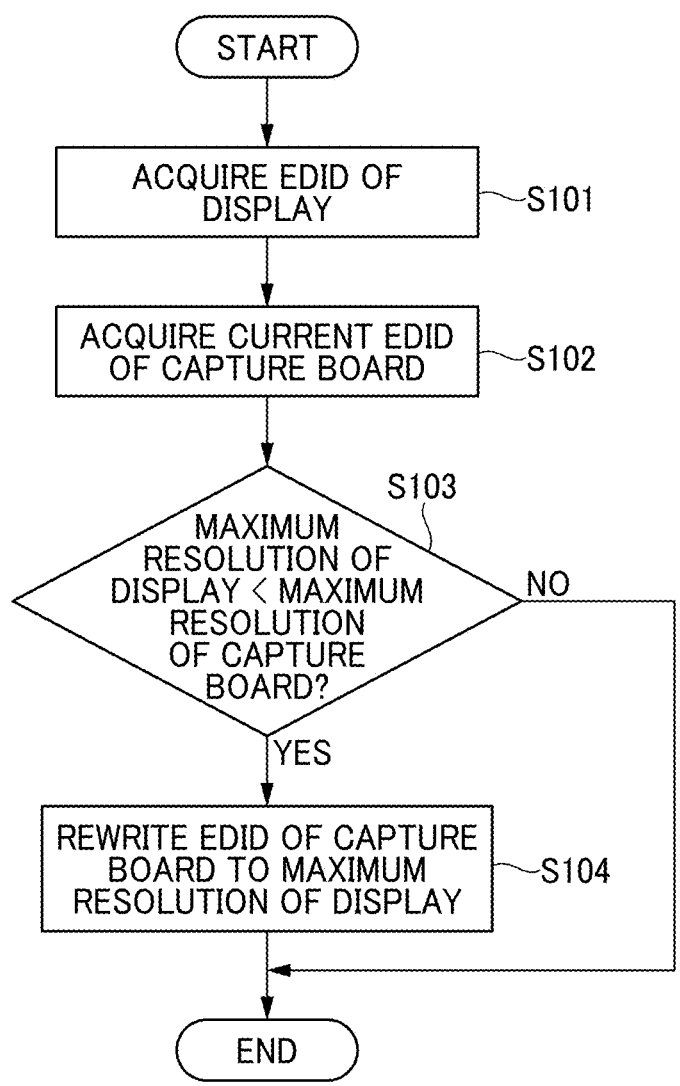
FIG. 29 is a flowchart illustrating a process of determining an appropriate resolution, performed by a controller, according to one or more embodiments.

FIG. 29 is a flowchart illustrating a process of determining an appropriate resolution, performed by the controller 110, according to the present embodiment. The process illustrated in FIG. 29 is automatically performed when an application for the display device 2 is activated on the OS. Since the application is activated when the power supply of the display device 2 is turned on, the application is also activated when the power supply of the display device 2 is turned on.

The first communication unit 204 of the controller 110 acquires the EDID of the display 3 (S101).

Next, the second communication unit 207 of the controller 110 acquires the EDID of the capture board 111 (S102). Either step S101 or S102 may come first.

The change unit 206 determines whether or not the maximum resolution of the display 3 is less than the maximum resolution of the capture board 111 (S103).

When the maximum resolution of the display 3 is less than the maximum resolution of the capture board 111, the change unit 206 changes the EDID of the capture board 111 (S104). That is, the maximum resolution of the capture board 111 is rewritten to be limited to the maximum resolution of the display 3.

as described above, when the EDID (format information) of the display 3 and the EDID (format information) of the capture board 111 are different from each other, the EDID of the capture board 111 is changed to the format information of the display 3. When the maximum value of the data size (resolution or frequency sampling number, which is described later) of the EDID of the display 3 is less than the maximum value of the data size of the EDID of the capture board 111, the maximum value of the data size of the EDID of the capture board 111 is limited to the maximum value of the data size of the EDID of the display 3.

Figure 30:
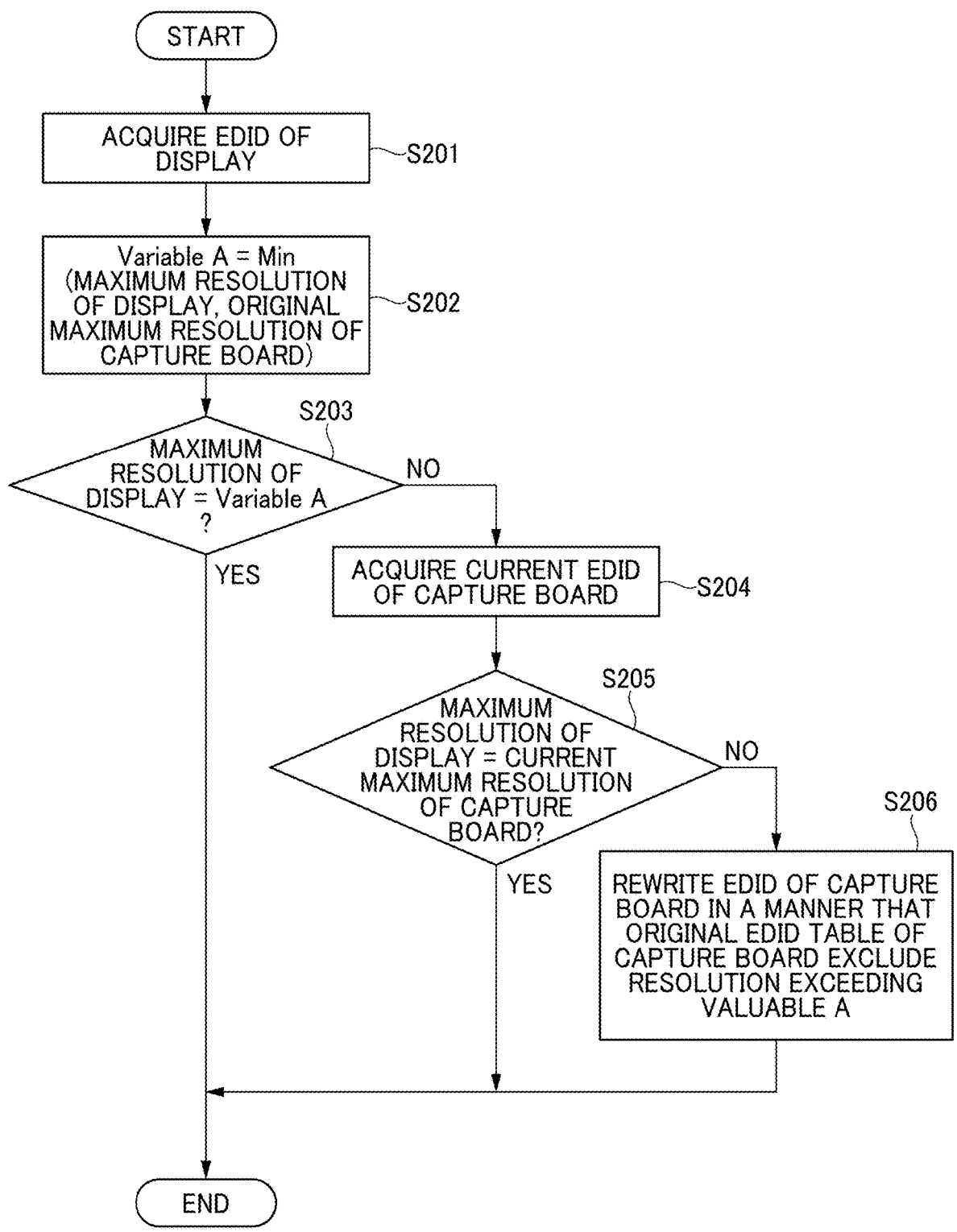
FIG. 30 is a flowchart illustrating a detailed process of determining an appropriate resolution, performed by a controller, according to one or more embodiments.

FIG. 30 is a flowchart illustrating a detailed process of determining an appropriate resolution, performed by the controller 110, according to the present embodiment.

The first communication unit 204 of the controller 110 acquires the EDID of the display 3 (S201). The change unit 206 stores a smaller one of the maximum resolution of the display 3 and the original maximum resolution of the capture board 111 as a variable A (S202). The original maximum resolution is the maximum resolution that the capture board 111 is able to support, and is stored as an initial value. For example, the original maximum resolution is 4K, 8K, or the like.

The change unit 206 determines whether the variable A matches the maximum resolution of the display 3 (S203).

When a result of the determination in step S203 is No, the second communication unit 207 acquires the current EDID from the acceptable video image format storage unit 209 of the capture board 111 (S204).

The change unit 206 determines whether the maximum resolution of the display 3 is equal to the maximum resolution of the capture board 111 (S205). This determination corresponds to the determination whether the maximum resolution of the display 3 is smaller than the maximum resolution of the capture board 111, which is determined in step S103 of FIG. 29.

When a result of the determination in step S205 is Yes, the EDID of the capture board 111 has been rewritten, and the change unit 206 does not rewrite the EDID.

When a result of the determination in step S205 is No, the change unit 206 deletes the EDID of the capture board 111 that exceeds the resolution of the variable A (S206). In other words, the EDID of the capture board 111 is rewritten with a resolution excluding those exceeding the resolution of the variable A from the EDID of the capture board 111. Through this, the change unit 206 limits the maximum resolution of the capture board 111 to the maximum resolution of the display 3.

The change unit 206 may change the EDID of the capture board 111 in step S206 without the determination of steps S203 and S205. There is no problem even if the same EDID is overwritten.

Information on Audio Included in EDID

In the embodiment above, the case in which the controller 110 changes the EDID of the capture board 111 with respect to the video image format included in the EDID is described. In addition to information on the video image, the EDID also has information on audio, and the controller 110 is also capable of changing the EDID of the capture board 111 with respect to an audio format.

FIG. 31 is a diagram illustrating an example of EDID related to the audio information. The EDID of audio includes items of the number of channels, a sampling frequency, and a bit rate. For example, when the maximum sampling frequency of the display 3 is 44 and the maximum sampling frequency of the capture board 111 is 48, the controller 110 limits the EDID of the capture board 111 to 44. Accordingly, the controller 110 is capable of limiting the EDID of audio in substantially the same manner as that of video image.

Overall Procedure

Figure 32:
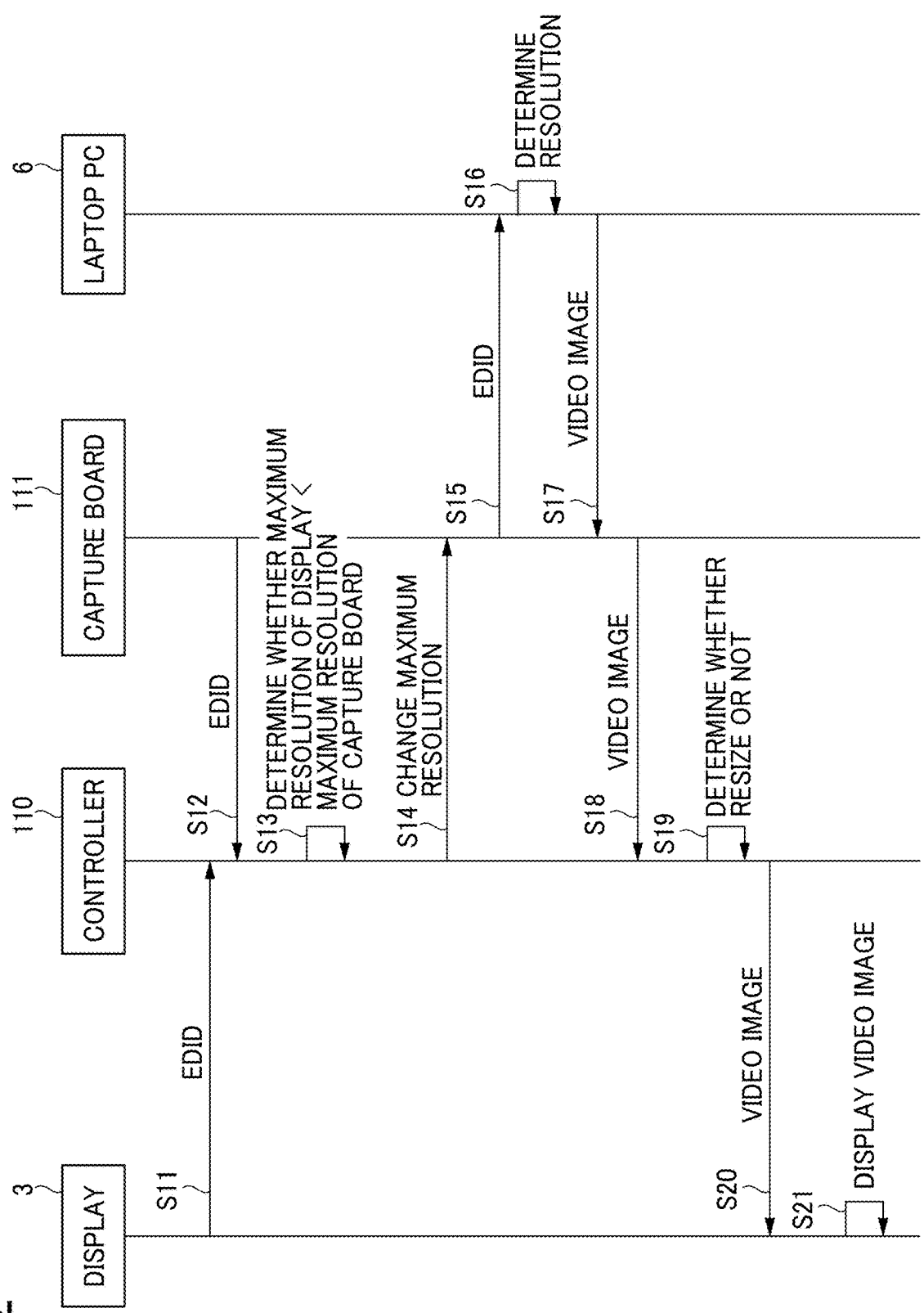
FIG. 32 is a sequence diagram illustrating a procedure until a video image is displayed by a controller, according to one or more embodiments.

FIG. 32 is a sequence diagram illustrating a procedure until a video image is displayed by the controller 110, according to the present embodiment.

S11: The first communication unit 204 of the controller 110 acquires the EDID of the display 3.

S12: The second communication unit 207 of the controller 110 acquires the EDID of the capture board 111. Either step S11 or S12 may come first.

S13: The change unit 206 of the controller 110 determines whether the maximum resolution of the display 3 is less than the maximum resolution of the capture board 111 or not. In the example, a case of "the maximum resolution of the display 3<the maximum resolution of the capture board 111" is described.

S14: The change unit 206 limits (changes) the maximum resolution of the capture board 111 to the maximum resolution of the display 3.

S15: When the laptop PC 6 is connected to the capture board 111 or the power supply of the display device 2 is turned on, the capture board 111 transmits the changed EDID to the laptop PC 6.

S16: The laptop PC 6 determines the maximum resolution that the own device is capable of outputting from the EDID of the capture board 111.

S17: The laptop PC 6 transmits the video image with the determined resolution to the capture board 111.

S18: When the external input connection unit 210 of the capture board 111 receives the video image, the external input video image reception unit 208 converts a signal and transmits the signal to the controller 110.

S19: The display video image generation unit 205 of the controller 110 receives the video image and determines whether the video image is required to be resized. In the example, since the maximum resolution of the display 3 and the resolution of the received video match, the determination indicates that resizing is not required. The display video image generation unit 205 combines the video image with a window prepared by the operating system.

S20: The first communication unit 204 of the controller 110 transmits the video image to the display 3.

S21: The external input connection unit 203 of the display 3 receives the video image, and the video image display unit 201 displays the video image.

As described above, the display device 2 according to the present embodiment limits the maximum resolution of the capture board 111 to the maximum resolution of the display 3 by changing the EDID of the capture board 111. As a result, resizing of a video image transmitted from a transmission source of the content data is not required, and image deterioration or increasing the load on the CPU 101 or GPU 112 is avoided.

Variation

The above-described embodiment is illustrative and do not limit the present disclosure. Thus, numerous additional modifications and variations are possible in light of the above teachings within the scope of the present invention. For example, elements and/or features of different illustrative embodiments may be combined with each other and/or substituted for each other within the scope of the present invention. Any one of the above-described operations may be performed in various other ways, for example, in an order different from the one described above.

For example, in the description of the exemplary embodiment given above, the displayable video image format of the display 3 or the acceptable video image format of the capture board is stored in the EDID, but this is not limiting, and the displayable video image format or the acceptable video image format of the capture board may not be stored in the EDID. The controller 110 may acquire the displayable video image format and rewrite the acceptable video image format of the capture board.

Further, in the description of the exemplary embodiment given above, the resolution of the acceptable video image format of the capture board 111 is changed, but this is not limiting, and a refresh rate of the capture board 111 may be changed.

Further, in the description of the exemplary embodiment given above, an electronic whiteboard is used as an example of the display device 2, but this is not limiting. A device having a substantially the same functions as the electronic whiteboard may be referred to as an electronic information board, an interactive board, or the like.

The display device 2 may also be implemented by a general-purpose information processing device such as a PC executing an application. Accordingly, the display device 2 includes an output apparatus such as a PC, a tablet PC, a wearable PC, a smartphone, a PDA, a projector (PJ), or a digital signage, a Head Up Display (HUD) device, an industrial machine, an image capturing device, a sound collector, a medical device, a network home appliance, a car (connected car), a mobile phone, a digital camera, a car navigation system, a game machine, and the like.

Further, in the above-described embodiment, the controller 110 determines the maximum resolution of the display and the maximum resolution of the capture board, but the disclosure is not limiting and the capture board 111 may make the determination. As an example, an embodiment in which the capture board 111 receives the maximum resolution of the display 3 from the controller 110, and the capture board 111 determines which of the maximum resolution of the display and the maximum resolution of the capture board is grater (or less) is conceivable.

In addition, the functional configuration as illustrated in FIG. 22 is divided into the blocks based on main functions of the display device 2, in order to facilitate understanding the processes performed by the display device 2. Each processing unit or each specific name of the processing unit is not to limit a scope of the present disclosure. A process implemented by the display device 2 may be divided into a larger number of processing units depending on the content of the processing. Further, one processing unit can be divided so as to include more processing.

Each of the functions of the described embodiments may be implemented by one or more processing circuits. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules designed to perform the recited functions.

A non-transitory recording medium storing a plurality of instructions (program) which, when executed by one or more processors, cause the processors to perform a method. The method includes receiving content data from a transmission source of the content data, checking first format information for the content data to be output, changing second format information of the content data to the first format information, and outputting the received content data. The second format information is supported by a capture board. The capture board is connected between the transmission source and a device including the one or more processors.

A controller (corresponding to the controller 110) includes a first communication unit (corresponding to the first communication unit 204) that receives first format information for content data from an output device (corresponding to the display 3). The first format information is possessed by the output device (corresponding to the display 3). The controller (corresponding to the controller 110) further includes a change unit (corresponding to the change unit 206) that changes second format information of the content data possessed by a reception device (corresponding to the capture board 111), which receives the content data from a device of transmission source, to the first format information.

In a conventional technique, there is an issue that format information of content data possessed by the output device is failed to be transmitted to a device of a transmission source of the content data. For example, when a display has a resolution of 4K (3840×2160) as the format information of the display and a reception device that receives the content data from the transmission source of the content data also supports the resolution of 4K, the load of the output apparatus does not increase so much by displaying the video image at the resolution of 4K. However, when the display supports a resolution of 2K and the reception device supports a resolution of 4K, information indicating that the display supports only the resolution of 2K is not transmitted to the transmission source of the content data. Accordingly, the transmission source of the content data transmits a 4K video image to the reception device, and the output apparatus is required to resize the 4K video image to a 2K video image to be displayed. At a time of conversion, deterioration of the video image may occur, or the load of the output apparatus may increase due to a process of resizing.

In view of the above-described issue, an object of the present disclosure is to provide an output apparatus capable of transmitting format information of content data possessed by an output device to a device that is a transmission source of the content data.

An object of the present disclosure is to provide an output apparatus capable of transmitting format information of content data possessed by an output device to a device that is a transmission source of the content data.

The invention claimed is:

1. An output apparatus, comprising:
    circuitry configured to:
    receive content data from a transmission source of the content data,
    acquire first format information for the content data to be output, the first format information being supported by an output device of the output apparatus,
    determine whether a maximum value of data size of the first format information is less than a maximum value of data size of a second format information, the second format information being supported by a capture board, the capture board being connected between the transmission source and the output apparatus, and the capture board being physically attached to the output apparatus, both of which are disposed in a same location,
    upon determining that the maximum value of the data size of the first format information is less than the maximum value of data size of the second format information, change the maximum value of the data size of the second format information to the maximum value of the data size of the first format information, and
    output the content data,
    wherein the first format information and the second format information include a same type of format of the content data, and
    the first format information and the second format information each include a resolution or a sampling frequency.

2. The output apparatus of claim 1,
    wherein the circuitry receives the second format information for the content data, and
    wherein, in a case where the first format information is different from the second format information, the circuitry changes the second format information of the content data to the first format information.

3. The output apparatus of claim 2,
    wherein the content data is video image data representing a video image, and each of the first format information and the second format information includes a maximum value of resolution for the video image, and
    wherein, in a case where the maximum value of resolution of the first format information is less than that of the second format information, the circuitry changes the maximum value of resolution of the second format information to that of the first format information.

4. The output apparatus of claim 1,
    wherein the content data is audio data representing audio, and each of the first format information and the second format information includes a maximum value of sampling frequency for the audio, and
    wherein, in a case where the maximum value of sampling frequency of the first format information is less than that of the second format information, the circuitry changes the maximum value of sampling frequency of the second format information to that of the first format information.

5. The output apparatus of claim 1,
    wherein each of the first format information and the second format information is extended display identification data (EDID).

6. The output apparatus of claim 1,
    wherein the circuitry outputs the content data to at least one of a display and a projector, and the circuitry receives the content data via the capture board that is configured to receive the content data from the transmission source of the content data.

7. The output apparatus of claim 1, wherein the capture board is physically attached to the output apparatus via a serial cable or a display cable.

8. An output system, comprising:
    a capture board to receive content data from another device, which is a transmission source of the content data;
    an output device to output the content data, and the capture board being physically attached to the output device, both of which are disposed in a same location; and
    a controller including circuitry configured to:
        receive, from the output device, first format information for the content data,
        determine whether a maximum value of data size of the first format information is less than a maximum value of data size of a second format information, the second format information being possessed by the capture board, and
        upon determining that the maximum value of the data size of the first format information is less than the maximum value of data size of the second format information, change the maximum value of the data size of the second format information to the maximum value of the data size of the first format information,
    wherein the first format information and the second format information include a same type of format of the content data, and
    the first format information and the second format information each include a resolution or a sampling frequency.

9. The output system of claim 8,
    wherein the capture board further includes a memory that stores the second format information for the content data, and
    wherein, in response to a power supply of the output device being turned on, the capture board starts operating, and notifies the transmission source of the content data that the capture board is connected and transmits the second format information stored in the memory to the transmission source of the content data.

10. The output system of claim 8, wherein the capture board is physically attached to the output apparatus via a serial cable or a display cable.

11. A method of changing format information, performed by an output apparatus, the method comprising:
    receiving content data from a transmission source of the content data;
    checking first format information for the content data to be output;
    determining whether a maximum value of data size of the first format information is less than a maximum value of data size of a second format information, the second format information being supported by a capture board, the capture board being connected between the transmission source and the output apparatus, and the capture board being physically attached to the output apparatus, both of which are disposed in a same location;

upon determining that the maximum value of the data size of the first format information is less than the maximum value of data size of the second format information, changing the maximum value of the data size of the second format information to the maximum value of the data size of the first format information; and outputting the content data according to the first format information, wherein the first format information and the second format information include a same type of format of the content data, and the first format information and the second format information each include a resolution or a sampling frequency.

12. The method of changing format information of claim 11, wherein the capture board is physically attached to the output apparatus via a serial cable or a display cable.

* * * * *